(12) United States Patent
Sugiyama et al.

(10) Patent No.: US 8,649,946 B2
(45) Date of Patent: Feb. 11, 2014

(54) IN-VEHICLE APPARATUS AND INFORMATION PROCESSING CENTER

(75) Inventors: Shinji Sugiyama, Tokyo (JP); Hiroaki Sekiyama, Tokyo (JP); Keiko Katsukawa, Tokyo (JP); Minako Fujishiro, Tokyo (JP); Yoshiharu Sato, Komae (JP); Yukiko Nakamura, Tokyo (JP); Yoshimi Kobayashi, Hadano (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/265,955

(22) PCT Filed: Apr. 24, 2009

(86) PCT No.: PCT/JP2009/058195
§ 371 (c)(1),
(2), (4) Date: May 21, 2012

(87) PCT Pub. No.: WO2010/122666
PCT Pub. Date: Oct. 28, 2010

(65) Prior Publication Data
US 2012/0221215 A1    Aug. 30, 2012

(51) Int. Cl.
*G06F 7/00* (2006.01)

(52) U.S. Cl.
USPC .......................................................... 701/51

(58) Field of Classification Search
None
See application file for complete search history.

(56) References Cited

U.S. PATENT DOCUMENTS

2007/0122771 A1* 5/2007 Maeda et al. .................. 434/62
2008/0294339 A1* 11/2008 Tauchi et al. ................ 701/212
2010/0250059 A1* 9/2010 Sekiyama et al. ............. 701/35

FOREIGN PATENT DOCUMENTS

| JP | 5-88475 | 12/1993 |
|----|---------|---------|
| JP | 10-185603 | 7/1998 |
| JP | 11-180185 | 7/1999 |
| JP | 2003-276472 | 9/2003 |
| JP | 2004-251786 | 9/2004 |
| JP | 2006-110096 | 4/2006 |
| JP | 2007-265074 | 10/2007 |
| JP | 2008-39678 | 2/2008 |

(Continued)

OTHER PUBLICATIONS

International Search Report issued Jul. 7, 2009, in PCT/JP2009/058195.
International Preliminary Report on Patentability issued Nov. 17, 2011, in PCT/JP2009/058 95.

*Primary Examiner* — Thomas Tarcza
*Assistant Examiner* — Garrett Evans
(74) *Attorney, Agent, or Firm* — Oblon, Spivak, McClelland, Maier & Neustadt, L.L.P.

(57) ABSTRACT

A vehicle information processing unit 16 collects vehicle information, which is information relating to the discharge amount of exhaust gas of at least one at any of a predetermined point, a predetermined section, and a predetermined period of time. An ecological traveling history DB 26 accumulates the vehicle information collected by the vehicle information processing unit 16 for each point through which the vehicle has traveled. A display device 30 displays the vehicle information accumulated in the ecological traveling history DB 26 by an image on a map including each point for each point through which the vehicle has traveled. Therefore, it becomes possible to allow a driver to recognize previous traveling performance at the point through which the vehicle has traveled, and to more effectively provide the driver with a guide or a motivation to perform ecological traveling, thereby providing a more useful in-vehicle apparatus which allows the driver to perform ecological traveling.

7 Claims, 31 Drawing Sheets

(56) References Cited

FOREIGN PATENT DOCUMENTS

| | | |
|---|---|---|
| JP | 2008-70128 | 3/2008 |
| JP | 2008-178282 | 7/2008 |
| JP | 2008-180576 | 8/2008 |
| JP | 2009-2847 | 1/2009 |
| JP | 2009-47640 | 3/2009 |
| WO | WO 2007/138744 A1 | 12/2007 |

* cited by examiner

VEHICLE SPEED (km/h) ON ORDINARY ROAD

*Fig.7*

| DATE | LATITUDE/ LONGITUDE | ECOLOGICAL TRAVELING DIAGNOSIS |
|---|---|---|
| 2008/10/30 | A POINT(x1,y1) | BAD |
| 2008/11/16 | A POINT(x1,y1) | STANDARD |
| 2008/11/22 | A POINT(x1,y1) | GOOD |
| 2008/11/22 | B POINT(x2,y2) | GOOD |
| 2008/11/29 | A POINT(x1,y1) | GOOD |

*Fig.8*

| 2008/12/10 | A POINT(x1,y1) | GOOD |

Fig.19

| DATE | MEMBER NUMBER | IN-VEHICLE APPARATUS NUMBER | LATITUDE/ LONGITUDE | ECOLOGICAL TRAVELING DIAGNOSIS |
|---|---|---|---|---|
| 2008/10/30 | 01532 | 3686 | A POINT(x1,y1) | BAD |
| 2008/11/16 | 10018 | 21924 | A POINT(x1,y1) | STANDARD |
| 2008/11/22 | 09373 | 13012 | A POINT(x1,y1) | GOOD |
| 2008/11/22 | 10018 | 21924 | B POINT(x2,y2) | GOOD |
| 2008/11/29 | 08147 | 11689 | A POINT(x1,y1) | GOOD |

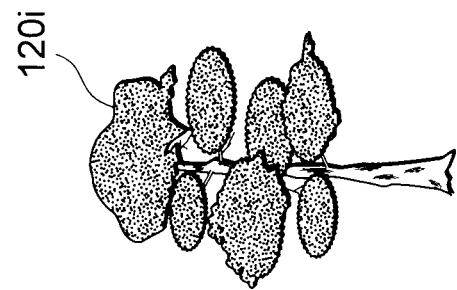
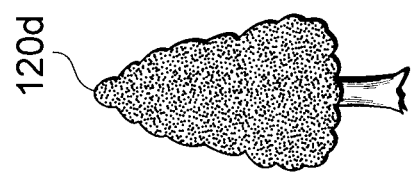
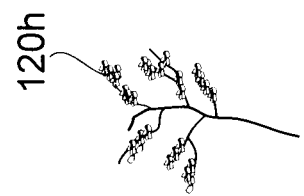
Fig.26

IN-VEHICLE APPARATUS AND INFORMATION PROCESSING CENTER

TECHNICAL FIELD

The present invention relates to an in-vehicle apparatus and an information processing center. In particular, the present invention relates to an in-vehicle apparatus and an information processing center for processing information, such as the discharge amount of exhaust gas of a vehicle.

BACKGROUND ART

In recent years, from the viewpoint of the protection of the global environment, there is an attempt to reduce the discharge amount of exhaust gas or the amount of fuel consumption of a vehicle, and to make the vehicle travel (hereinafter, referred to as "ecological", "ecological traveling", or "ecological driving") contributing to the protection of the environment. For example, Patent Literature 1 describes a navigation system in which the current position and the traveling locus of a vehicle are successively displayed on a display unit, and the traveling performance (vehicle speed or mileage) of the vehicle is displayed on the traveling locus.

In this navigation system, the display color or display line of the traveling locus changes depending on the traveling performance. In this navigation system, for example, the traveling locus is displayed green when the vehicle speed is equal to or lower than 20 km/h, blue when the vehicle speed is 20 km/h to 40 km/h, black when the vehicle speed is 40 km/h to 80 km/h, and red when the vehicle speed is equal to or higher than 80 km/h, thereby allowing a driver to intuitively perceive the traveling performance.

CITATION LIST

Patent Literature

[Patent Literature 1] Japanese Examined Patent Application Publication No. 5-88475

SUMMARY OF INVENTION

Technical Problem

However, in the above-described technique, since only the vehicle speed or mileage for each route of traveling at that time is displayed, with regard to a road on which the vehicle is currently traveling or a road on which the vehicle will travel, the vehicle speed or mileage of the vehicle which has been heretofore traveling is unclear. That is, in the above-described technique, for the driver of the vehicle, the degree of attainment of ecological traveling is simply displayed only at that time. For this reason, in the above-described technique, it may be impossible to provide the driver with a guide or a motivation to allow the driver to perform ecological traveling in the future. Accordingly, the technique of the related art described above is not a sufficient support technique such that the driver performs ecological traveling or the conscious of ecological driving increases.

The invention has been finalized in consideration of the above-described situation, and an object of the invention is to provide an in-vehicle apparatus and an information processing center useful for allowing a driver to perform ecological traveling.

Solution to Problem

An in-vehicle apparatus of the invention includes a vehicle information collection device which collects vehicle information, which is information relating to the emission amount of at least one vehicle at any of a predetermined point, a predetermined section, and a predetermined period of time, a traveling history database which accumulates the vehicle information collected by the vehicle information collection device along with a point through which the vehicle has traveled, and a display device which displays the vehicle information accumulated in the traveling history database for each point through which the vehicle has traveled.

With this configuration, the vehicle information collection device collects the vehicle information, which is the information relating to the emission amount of at least one vehicle at any of a predetermined point, a predetermined section, and a predetermined period of time. The traveling history database accumulates the vehicle information collected by the vehicle information collection device along with a point through which the vehicle has traveled. The display device displays the vehicle information accumulated in the traveling history database for each point through which the vehicle has traveled. Therefore, it is possible for the driver to recognize the previous traveling performance at a point through which the vehicle has traveled, and it becomes possible to effectively provide the driver with a guide or a motivation to allow the driver to perform ecological traveling. As a result, it is possible to provide a useful in-vehicle apparatus which allows the driver to perform ecological traveling.

In this case, the information relating to the emission amount may be information relating to at least one of the discharge amount of exhaust gas, the amount of fuel consumption, the vehicle speed, the acceleration, and the use gear of the transmission of the vehicle.

With this configuration, the determination on whether or not the vehicle has performed ecological traveling is made by the discharge amount of the exhaust gas, the amount of fuel consumption, the vehicle speed, the acceleration, and the use gear of the transmission of the vehicle. Therefore, it becomes possible to more accurately determine whether or not the vehicle has performed ecological traveling.

The display device may change the content to be displayed in accordance with the vehicle information for each point through which the vehicle has traveled.

With this configuration, the display device changes the content to be displayed in accordance with the vehicle information for each point through which the vehicle has traveled. Therefore, it is possible for the driver to intuitively recognize the traveling performance of the vehicle.

The display device may display the vehicle information accumulated in the traveling history database by an image on a map including each point for each point through which the vehicle has traveled.

With this configuration, the display device displays the vehicle information accumulated in the traveling history database by the image on the map including each point for each point through which the vehicle has traveled. Therefore, it is possible for the driver to more intuitively recognize the traveling performance of the vehicle visually.

In this case, the display device may display the vehicle information with a symbol on the map.

With this configuration, the display device displays the vehicle information with a symbol on the map. Therefore, it is possible for the driver to more intuitively recognize the traveling performance of the vehicle.

In this case, the display device may display the symbol on the map on a more magnified scale when the discharge amount of the exhaust gas in the vehicle information is smaller, when the amount of fuel consumption in the vehicle information is smaller, when the vehicle speed in the vehicle information is lower, when the acceleration in the vehicle information is lower, or when the reduction ratio of the use gear of the transmission in the vehicle information is smaller.

With this configuration, the display device displays the symbol on the map on a more magnified scale when the degree of attainment of ecological traveling of the vehicle is higher, for example, when the discharge amount of the exhaust gas in the vehicle information is smaller, or the like. Therefore, it becomes possible to more intuitively recognize the traveling performance of the vehicle.

The display device may change and display the symbol in accordance with at least one of the type, size, displacement, and mileage of the vehicle.

With this configuration, the display device changes and displays the symbol in accordance with at least one of the type, size, displacement, and mileage of the vehicle. Therefore, it is possible for the driver to intuitively recognize the type, size, displacement, and mileage of the vehicle, and it becomes possible to provide the driver with a guide or a motivation to perform more accurate ecological traveling. With regard to the type, size, displacement, and mileage of the vehicle, for example, the values on the catalog of the vehicle can be referenced.

The display device may change and display the symbol in accordance with at least one of the driving skill and experience of the driver of the vehicle.

With this configuration, the display device changes and displays the symbol in accordance with at least one of the driving skill and experience of the driver of the vehicle. Therefore, it is possible for the driver to intuitively recognize the driving skill or experience of the driver, and it becomes possible to provide the driver with a guide or a motivation to perform more accurate ecological traveling.

The traveling history database may accumulate the vehicle information for a plurality of vehicles along with points through which the vehicles have traveled, and the display device may display the vehicle information for a plurality of vehicles accumulated in the traveling history database for the respective points through which a plurality of vehicles have traveled.

With this configuration, the traveling history database accumulates the vehicle information for a plurality of vehicles along with the points through which the vehicles have traveled, and the display device displays the vehicle information for a plurality of vehicles accumulated in the traveling history database for the respective points through which a plurality of vehicles have traveled. Therefore, it is possible for the driver to compare the traveling performances of a host vehicle and other vehicles, not for only the host vehicle, and to objectively evaluate whether the traveling performance is good or bad.

In this case, the display device may display the vehicle information for a plurality of vehicles accumulated in the traveling history database by images on a map including the points for the respective points through which a plurality of vehicles have traveled.

With this configuration, the display device displays the vehicle information for a plurality of vehicles accumulated in the traveling history database by the images on the map including the points for the respective points through which a plurality of vehicles have traveled. Therefore, it is possible for the driver to intuitively compare the traveling performances of the host vehicle and other vehicles visually.

In this case, the display device may display the vehicle information for a plurality of vehicles with symbols on a map, and may change and display the symbols between a host vehicle and other vehicles.

With this configuration, the display device displays the vehicle information for a plurality of vehicles with the symbols on the map, and changes and displays the symbol between the host vehicle and other vehicles. Therefore, it is possible for the driver to intuitively recognize the degree of contribution to the protection of the environment by the traveling performance of the host vehicle. For this reason, the driver evaluates his/her traveling, making it easy to obtain a guide or a motivation to perform ecological traveling in future traveling.

When traffic flow at each point is heavier, the display device may enlarge more an area where the symbol is displayed on the map near the point.

With this configuration, when the traffic flow at each point is heavier, the display device enlarges more the area where the symbol is displayed on the map near the point. Therefore, it becomes easy for the driver to intuitively obtain the traffic flow at the point. For this reason, even though a display area is wide, when a symbol with bad traveling performance is displayed, it is possible for the driver to intuitively recognize that many vehicles are not performing ecological traveling.

An information processing center of the invention includes a vehicle information collection device which collects vehicle information, which is information relating to the emission amount of at least one vehicle at any of a predetermined point, a predetermined section, and a predetermined period of time, a traveling history database which accumulates the vehicle information collected by the vehicle information collection device along with a point through which the vehicle has traveled, and a distribution device which distributes the vehicle information accumulated in the traveling history database to the vehicle.

With this configuration, the vehicle information collection device collects the vehicle information, which is the information relating to the emission amount of at least one vehicle at any of a predetermined point, a predetermined section, and a predetermined period of time. The traveling history database accumulates the vehicle information collected by the vehicle information collection device along with a point through which the vehicle has traveled. The distribution device distributes the vehicle information accumulated in the traveling history database to the vehicle. Therefore, it is possible for the driver of the vehicle, to which the vehicle information is distributed, to recognize the previous traveling performance at the point through which the vehicle has traveled, and it becomes possible to effectively provide the driver with a guide or a motivation to perform ecological traveling. As a result, it is possible to provide a more useful information processing center which allows the driver to perform ecological traveling.

An information processing center of the invention includes a vehicle information collection device which collects vehicle information, which is information relating to the emission amount of at least one vehicle at any of a predetermined point, a predetermined section, and a predetermined period of time, an ecological traveling determination device which determines the degree of contribution of traveling of the vehicle to the protection of the environment, on the basis of the vehicle information collected by the vehicle information collection device, a traveling history database which accumulates ecological traveling information, which is the degree of contribution of traveling of the vehicle to the protection of the environment determined by the ecological traveling determination device, along with a point through which the vehicle has traveled, and a distribution device which distributes the ecological traveling information accumulated in the traveling history database to the vehicle.

With this configuration, the vehicle information collection device collects the vehicle information, which is the information relating to the emission amount of at least one vehicle at any of a predetermined point, a predetermined section, and a predetermined period of time. The ecological traveling determination device determines the degree of contribution of traveling of the vehicle to the protection of the environment on the basis of the vehicle information collected by the vehicle information collection device. The traveling history database accumulates the ecological traveling information, which is the degree of contribution of traveling of the vehicle to the protection of the environment determined by the ecological traveling determination device, along with the point through which the vehicle has traveled. The distribution device distributes the ecological traveling information accumulated in the traveling history database to the vehicle. Therefore, the vehicle simply has a function of transmitting the vehicle information to the information processing center and receiving the ecological traveling information from the information processing center, such that it is possible for the driver of the vehicle, to which the ecological traveling information is distributed, to recognize the performance of previous ecological traveling at the point through which the vehicle has traveled, thereby simplifying the equipment of the vehicle.

In this case, the information relating to the emission amount may be information relating to at least one of the discharge amount of exhaust gas, the amount of fuel consumption, the vehicle speed, the acceleration, and the use gear of the transmission of the vehicle.

With this configuration, the determination on whether or not the vehicle has performed ecological traveling is made by the discharge amount of the exhaust gas, the amount of fuel consumption, the vehicle speed, the acceleration, and the use gear of the transmission of the vehicle. Therefore, it becomes possible to more accurately determine whether or not the vehicle has performed ecological traveling.

The vehicle information collection device may collect information relating to at least one of the type, size, displacement, and mileage of the vehicle, the traveling history database may accumulate one of the vehicle information and the ecological traveling information in association with the information relating to at least one of the type, size, displacement, and mileage of the vehicle collected by the vehicle information collection device, and the vehicle information distribution device may distribute one of the vehicle information and the ecological traveling information accumulated in the traveling history database, and the information relating to at least one of the type, size, displacement, and mileage of the vehicle accumulated in association with the vehicle information.

With this configuration, the vehicle information collection device collects information relating to at least one of the type, size, displacement, and mileage of the vehicle. The traveling history database accumulates one of the vehicle information and the ecological traveling information in association with the information relating to at least one of the type, size, displacement, and mileage of the vehicle collected by the vehicle information collection device. The vehicle information distribution device distributes one of the vehicle information and the ecological traveling information accumulated in the traveling history database, and the information relating to at least one of the type, size, displacement, and mileage of the vehicle accumulated in association with the vehicle information. For this reason, it is possible for the driver of the vehicle, to which the vehicle information or the ecological traveling information is distributed, to recognize what traveling performance the vehicles having various types, sizes, displacements, and mileages achieve at each point. In particular, it is possible for the driver to recognize the degree of ecological traveling, which is performed by a vehicle having the same displacement or mileage as the vehicle being driven by the driver, at each point, and it becomes possible to more effectively provide the driver with a guide or a motivation to perform ecological traveling.

The vehicle information collection device may collect at least one of the driving skill and experience of the driver of the vehicle, the traveling history database may accumulate one of the vehicle information and the ecological traveling information in association with at least one of the driving skill and experience of the driver of the vehicle collected by the vehicle information collection device, and the vehicle information distribution device may distribute one of the vehicle information and the ecological traveling information accumulated in the traveling history database, and the information relating to at least one of the driving skill and experience of the driver of the vehicle accumulated in association with one of the vehicle information and the ecological traveling information.

With this configuration, the vehicle information collection device collects at least one of the driving skill and experience of the driver of the vehicle. The traveling history database accumulates one of the vehicle information and the ecological traveling information in association with at least one of the driving skill and experience of the driver of the vehicle collected by the vehicle information collection device. The vehicle information distribution device distributes one of the vehicle information and the ecological traveling information accumulated in the traveling history database, and the information relating to at least one of the driving skill and experience of the driver of the vehicle accumulated in association with one of the vehicle information and the ecological traveling information. It is possible for the driver of the vehicle, to which the vehicle information or the ecological traveling information is distributed, to recognize what traveling performance the drivers having various driving skills and experience achieve. In particular, it is possible for the driver to recognize the degree of ecological traveling, which is performed by another driver having comparable driving skill and experience, at each point, and it becomes possible to more effectively provide the driver with a guide or a motivation to perform ecological traveling.

The vehicle information collection device may collect information for identifying the vehicles, the traveling history database accumulates one of the vehicle information and the ecological traveling information in association with the information for identifying the vehicles collected by the vehicle information collection device, and the vehicle information distribution device may distribute one of the vehicle information and the ecological traveling information accumulated in the traveling history database, and the information for identifying the vehicles accumulated in association with one of the vehicle information and the ecological traveling information.

With this configuration, the vehicle information collection device collects information for identifying the vehicles. The traveling history database accumulates one of the vehicle information and the ecological traveling information in association with the information for identifying the vehicles collected by the vehicle information collection device. The vehicle information distribution device distributes one of the vehicle information and the ecological traveling information accumulated in the traveling history database, and the information for identifying the vehicles accumulated in association with one of the vehicle information and the ecological traveling information. For this reason, it is possible for the driver to intuitively recognize the degree of contribution to the protection of the environment by the traveling performance of the host vehicle. Therefore, the driver evaluates his/her traveling, making it easy to obtain a guide or a motivation to perform ecological traveling in future traveling.

The vehicle information collection device may collect information relating to the traffic flow at the point through which the vehicle has traveled, and the vehicle information distribution device may distribute one of the vehicle information and the ecological traveling information accumulated in the traveling history database, and the information relating to the traffic flow at the point, through which the vehicle has traveled, collected by the vehicle information collection device.

With this configuration, the vehicle information collection device collects information relating to the traffic flow at the point through which the vehicle has traveled. The vehicle information distribution device distributes one of the vehicle information and the ecological traveling information accumulated in the traveling history database, and the information relating to the traffic flow at the point, through which the vehicle has traveled, collected by the vehicle information collection device. For this reason, it becomes easy for the driver to recognize the traffic flow at the point. Therefore, even though the traffic flow is heavy, when the vehicle information or the ecological traveling information indicating that the traveling performance is bad is received, it is possible for the driver to recognize that many vehicles are not performing ecological traveling.

Advantageous Effects of Invention

According to the in-vehicle apparatus and the information processing center of the invention, it is possible to provide a more useful in-vehicle apparatus and an information processing center which allows a driver to perform ecological traveling.

BRIEF DESCRIPTION OF DRAWINGS

FIG. 7 is a diagram showing ecological traveling history information recorded in an ecological traveling history DB.

FIG. 8 is a diagram showing current traveling improvement.

FIG. 19 is a diagram showing ecological traveling history information of members recorded in a member ecological traveling history DB.

FIG. 26 is a diagram showing the transition of an image to be displayed on background map in accordance with how much driving experience members have.

DESCRIPTION OF EMBODIMENTS

Hereinafter, an in-vehicle apparatus and a center according to an embodiment of the invention will be described with reference to the drawings.

Figure 1:
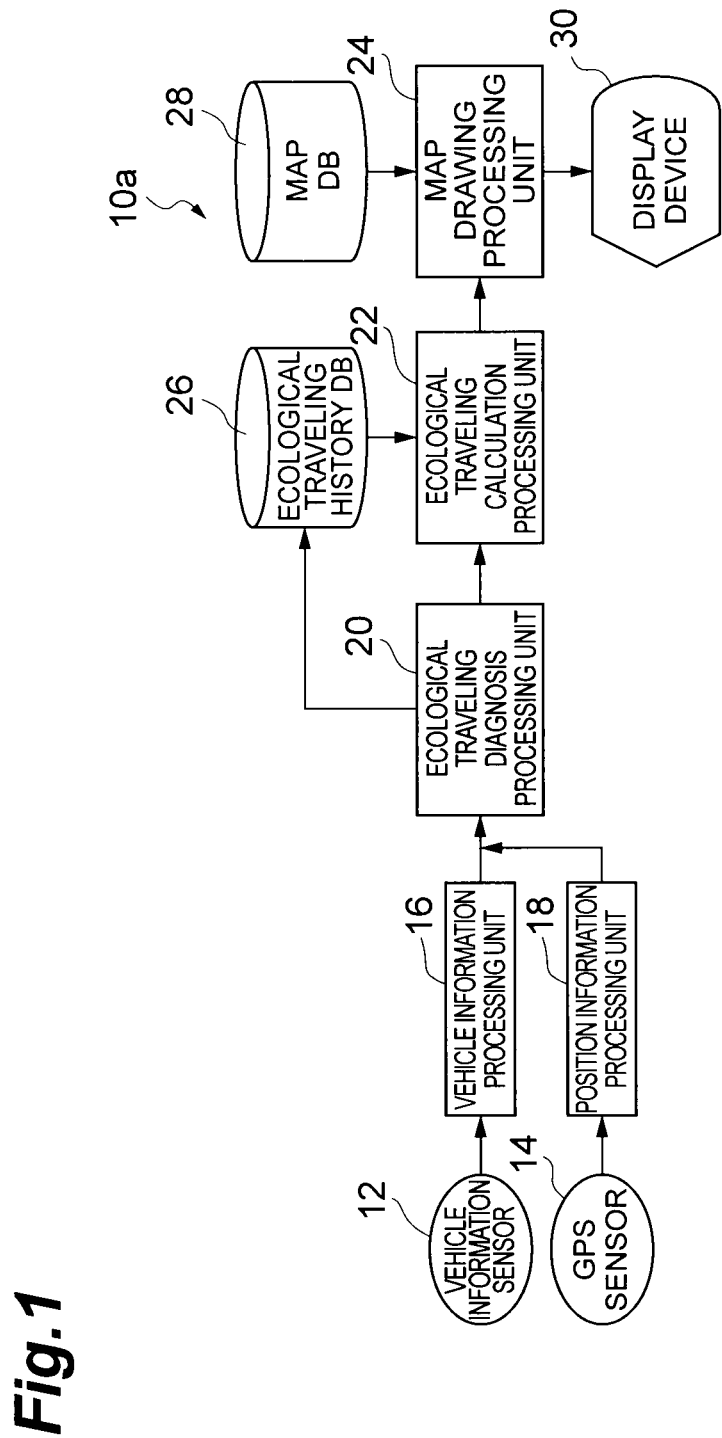
FIG. 1 is a block diagram showing the configuration of an in-vehicle apparatus according to a first embodiment.

The in-vehicle apparatus of this embodiment is mounted in a vehicle, and is used to display the traveling performance of ecological traveling at each point for a driver. As shown in FIG. 1, an in-vehicle apparatus 10a of this embodiment includes a vehicle information sensor 12, a GPS sensor 14, a vehicle information processing unit 16, a position information processing unit 18, an ecological traveling diagnosis processing unit 20, an ecological traveling calculation processing unit 22, a map drawing processing unit 24, an ecological traveling history DB 26, a map DB 28, and a display device 30.

The vehicle information sensor 12 is used to acquire various kinds of information the vehicle. Specifically, the vehicle information sensor 12 is a sensor which detects various kinds of vehicle information, such as discharge amount of exhaust gas, the amount of fuel consumption, the vehicle speed, the acceleration, and the use gear of the transmission of the vehicle, at any of a predetermined point, a predetermined section, and a predetermined period of time. As the discharge amount of the exhaust gas, the discharge amount of carbon oxide (COx), nitrided oxide (NOx), carbon hydride (HC), or the like can be detected. As the use gear of the transmission, in the case of an automatic transmission, it can be detected whether or not the shift lever position is the D range, whether the vehicle is a power mode in which an acceleration is emphasized or a sports mode, or whether or not the vehicle is an EV mode in which traveling is performed with an electrical motor.

The GPS sensor 14 receives signals from GPS (Global Positioning System) satellites by a GPS receiver, and measures the position of the vehicle from the difference between the signals.

The vehicle information processing unit 16 is used to process signals relating to various kinds of vehicle information output from the vehicle information sensor 12 in a state of being processed by the ecological traveling diagnosis processing unit 20.

The position information processing unit 18 is used to process a signal relating to the position of the vehicle output from the GPS sensor 14 in a state of being processed by the ecological traveling diagnosis processing unit 20.

The ecological traveling diagnosis unit 20 is used to determine whether or not various kinds of vehicle information, such as discharge amount of exhaust gas, the amount of fuel consumption, the vehicle speed, the acceleration, and the use gear of the transmission of the vehicle, satisfy predetermined conditions and the vehicle is performing ecological traveling at any of a predetermined point, a predetermined section, and a predetermined period of time on the basis of vehicle information processed by the vehicle information processing unit 16 and position information processed by the position information processing unit 18 by a method described below.

The ecological traveling history DB 26 is used to accumulate the determination result (ecological traveling information) diagnosed by the ecological traveling diagnosis processing unit 20 on whether or not the vehicle is performing ecological traveling at each point through which the vehicle has traveled.

The ecological traveling diagnosis unit 20 authorizes an individual driver, and calculates ecological traveling information for each individual driver. The ecological traveling history DB 26 may accumulate ecological traveling information for each individual driver.

The ecological traveling calculation processing unit 22 is used to combine current ecological traveling information processed by the ecological traveling diagnosis processing unit 20 and previous ecological traveling information accumulated in the ecological traveling history DB 26 to create information indicating the situation of ecological traveling at each point through which the vehicle has traveled.

The map drawing processing unit 24 is used to, on the basis of the information created by the ecological traveling calculation processing unit 22 indicating the situation of ecological traveling at each point, through which the vehicle has traveled and map information recorded in the map DB 28 near the point through which the vehicle has traveled, display the situation of ecological traveling at the point on the display device 30 of the navigation system or the like.

Figure 2:
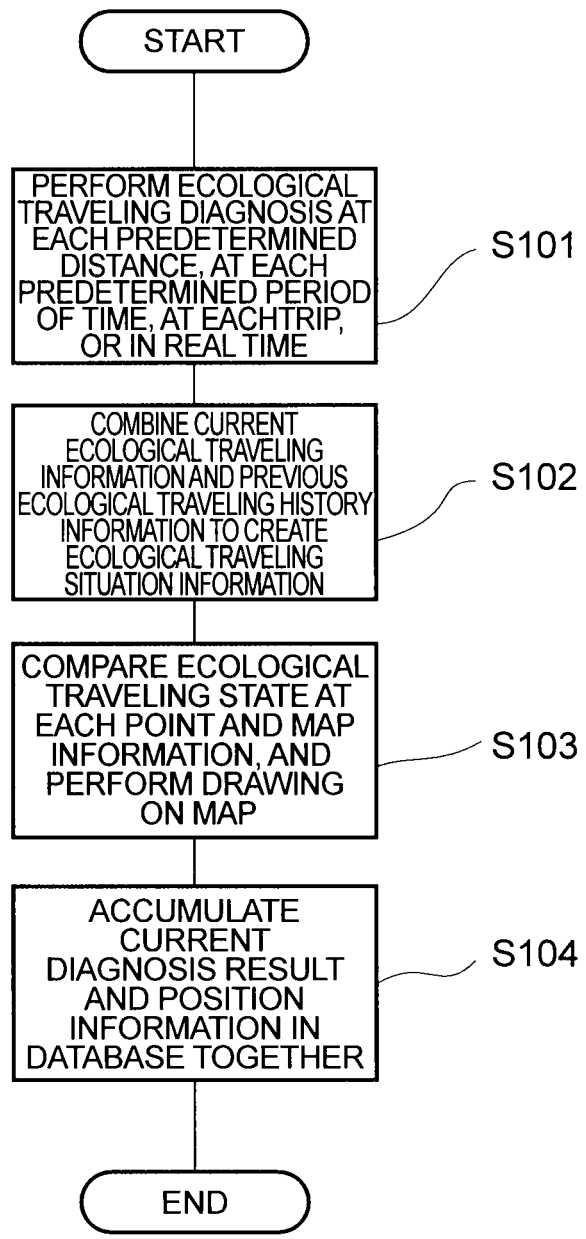
FIG. 2 is a flowchart showing the operation of the in-vehicle apparatus according to the first embodiment.

Hereinafter, the operation of the in-vehicle apparatus 10a of this embodiment will be described. As shown in FIG. 2, during traveling, the ecological traveling diagnosis processing unit 20 of the in-vehicle apparatus 10a performs ecological traveling diagnosis for each predetermined distance (for example, 100 m), each predetermined time (for example, 10 seconds), or each traveling route (each Trip), or in real time (S101).

Figure 3:
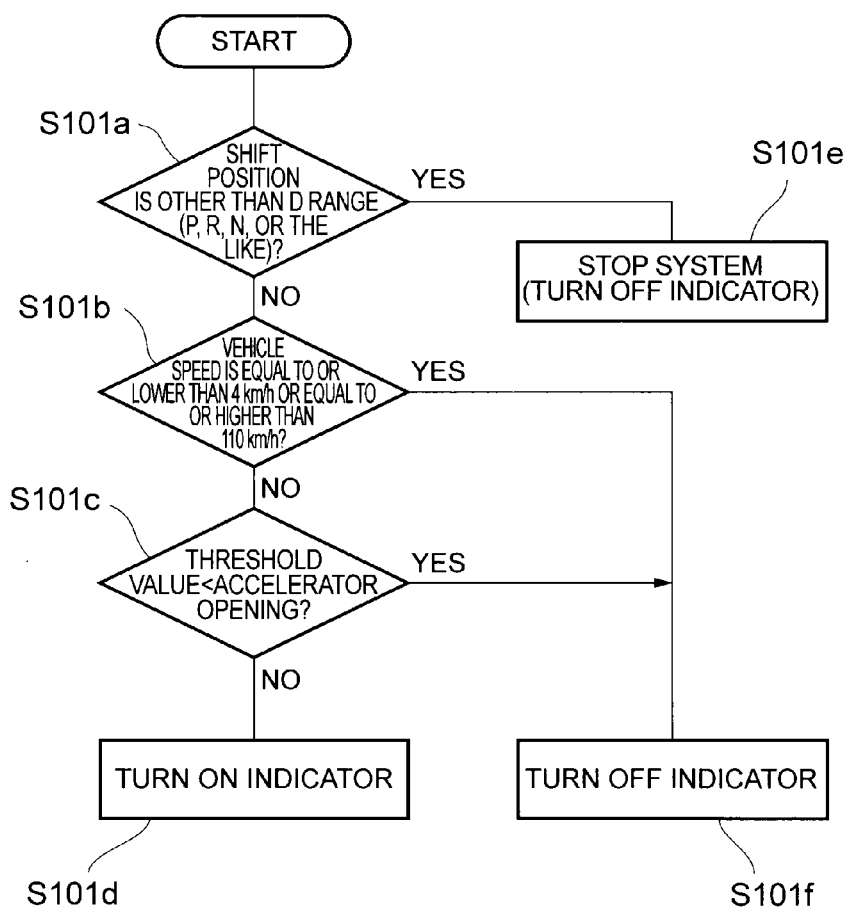
FIG. 3 is a flowchart showing a procedure of ecological traveling diagnosis according to the first embodiment.

Hereinafter, a method for ecological traveling diagnosis by the ecological traveling diagnosis processing unit 20 will be described. As shown in FIG. 3, the ecological traveling diagnosis processing unit 20 confirms the condition that the shift position of the automatic transmission detected by the vehicle information sensor 12 is not other than the D range (P, R, N, sports mode, power mode, or the like) (S101a). The ecological traveling diagnosis processing unit 20 confirms the condition that the vehicle speed detected by the vehicle information sensor 12 is not within a predetermined range, for example, not equal to or lower than 4 km/h, or not equal to or higher than 110 km/h (S101b). The ecological traveling diagnosis processing unit 20 confirms the condition that the accelerator opening (acceleration) of the vehicle detected by the vehicle information sensor 12 does not exceed a predetermined threshold value (S101c).

Figure 4:
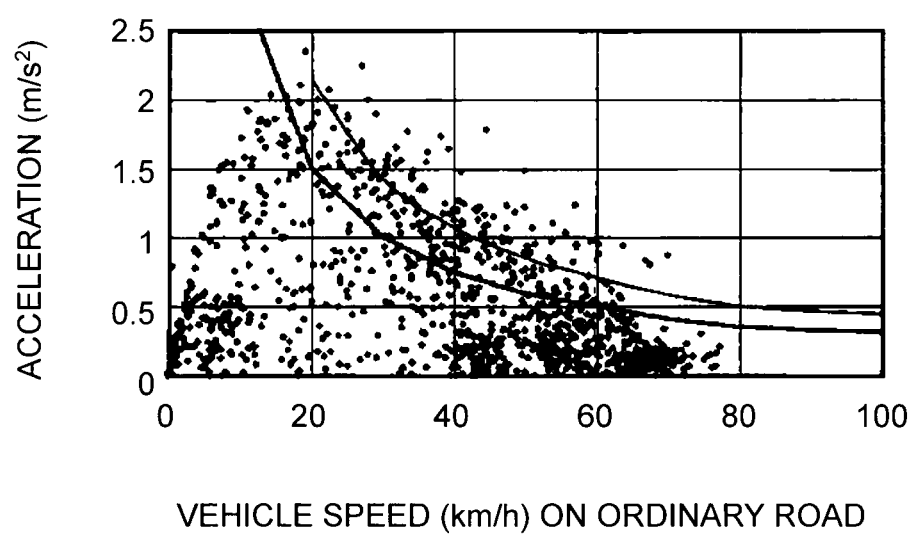
FIG. 4 is a graph showing the relationship between a vehicle speed and an acceleration as reference for obtaining an accelerator opening threshold value.

In this case, the threshold value of the acceleration, for example, as shown in FIG. 4, the statistics on an acceleration $(m/s^2)$ with respect to a vehicle speed (km/h) on an ordinary road is maintained, and a value which is 70% of the upper limit value of the acceleration with respect to the vehicle speed can be set as the threshold value.

Returning to FIG. 3, when the shift position of the automatic transmission is the D range (S101a), the vehicle speed is not equal to or lower than 4 km/h, or not equal to or higher than 110 km/h (S101b), and the acceleration of the vehicle is equal to or greater than the threshold value (S101c), the ecological traveling diagnosis processing unit 20 turns on an indicator indicating that the vehicles performs ecological traveling, and allows the driver to make confirmation (S101d). The threshold value equal to or greater than 110 km/h is on the assumption that the vehicle travels on an expressway and ecological traveling is performed with difficulty, and can be defined, for example, in the range of 104 km/h to 120 km/h. The threshold value equal to or greater than 4 km/h is on the assumption that the vehicle travels on a congested road or the like and ecological traveling is performed with difficulty, and can be defined, for example, in the range of 1 km/h to 10 km/h.

When the shift position of the automatic transmission is not the D range (S101a), the ecological traveling diagnosis processing unit 20 stops the system and turns off the indicator (S101e). When the vehicle speed is equal to or lower than 4 km/h, or equal to or higher than 110 km/h (S101b), or when the acceleration of the vehicle exceeds the threshold value (S101c), the ecological traveling diagnosis processing unit 20 turns off the indicator (S101f).

In this way, the ecological traveling diagnosis processing unit 20 can determine whether or not the vehicle performs ecological traveling. In this case, the determination result of ecological traveling can be made in three steps of, for example, "good", "standard", and "bad" on the basis of the rate of turn-on of the indicator indicating the performance of ecological traveling at a predetermined distance or within a predetermined time.

Figure 5:
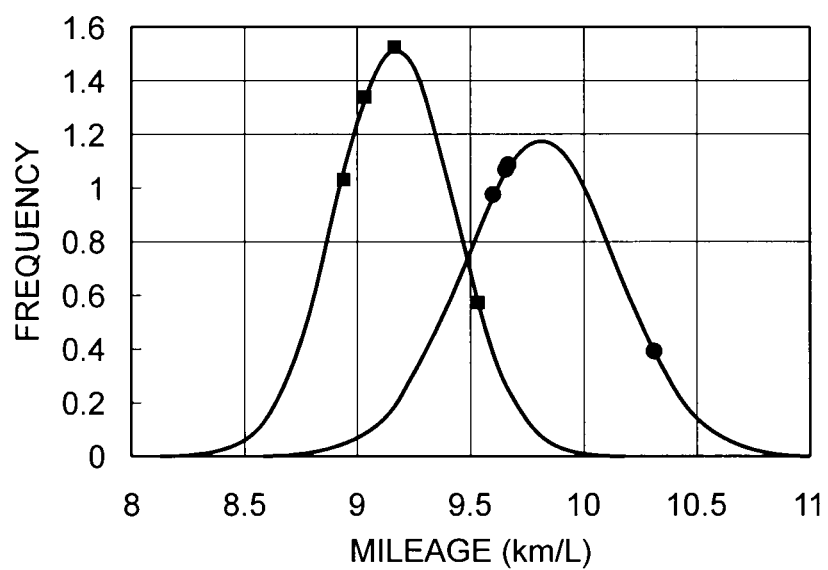
FIG. 5 is a graph showing the improvement in mileage by ecological traveling.
Figure 6:
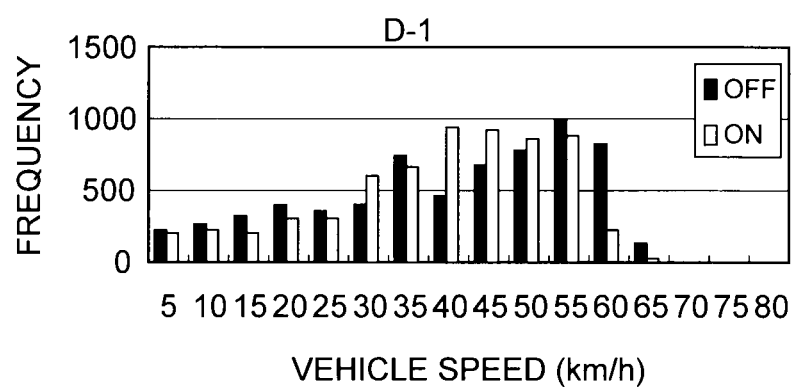
FIG. 6 is a graph showing the reduction in vehicle speed by ecological traveling.

In a state of ecological traveling in which the indicator is turned on, as shown in a graph of circular plots of FIG. 5, it is understood that the mileage is improved by an average of about 7% compared to a graph of rectangular plots in the case of normal traveling. As shown in FIG. 6, when ecological traveling is performed (ON), it is understood that the vehicle speed is reduced by an average of about 10 km/h compared to when ecological traveling is not performed (OFF).

Returning to FIG. 2, the ecological traveling calculation processing unit 22 combines current ecological traveling information processed by the ecological traveling diagnosis processing unit 20 and previous ecological traveling information accumulated in the ecological traveling history DB 26 to create the information indicating the situation of ecological traveling at each point through which the vehicle has traveled (S102).

As shown in FIG. 7, the ecological traveling history DB 26 accumulates the date on which the vehicle has traveled, the latitude/longitude of a point through which the vehicle has traveled, and the diagnosis result of the ecological traveling diagnosis processing unit 20 in association with each other. The ecological traveling calculation processing unit 22 integrates only data within an arbitrary period, such as one previous month, or within the number of Trips, such as 100 Trips, from the ecological traveling history DB 26. This is because, if there is an excessive amount of information to be added, it may be impossible to accurately recognize the state of ecological traveling on a road through which the vehicle passes every day.

Figure 8:
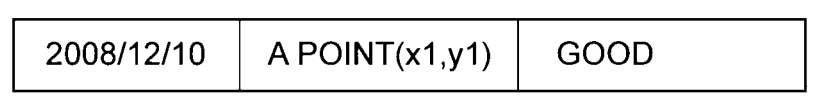

In the example of FIG. 7, when information on an A point within one month 1 is collected, the result of ecological traveling diagnosis is "good" twice. As shown in FIG. 8, the result of current ecological traveling diagnosis when traveling through the A point is "good". Thus, the ecological traveling calculation processing unit 22 adds twice of "good" which is the result of previous ecological traveling diagnosis and once of "good" which is the result of current ecological traveling diagnosis, thereby calculating ecological traveling information to be expressed as three times of "good".

Returning to FIG. 2, the map drawing processing unit 24 compares the state of ecological traveling for each point calculated by the ecological traveling calculation processing unit 22 and map information of the map DB 28, and draws a symbol indicating ecological traveling information on the display screen of the display device 30 aside of the road (link) (S103).

Figure 9:
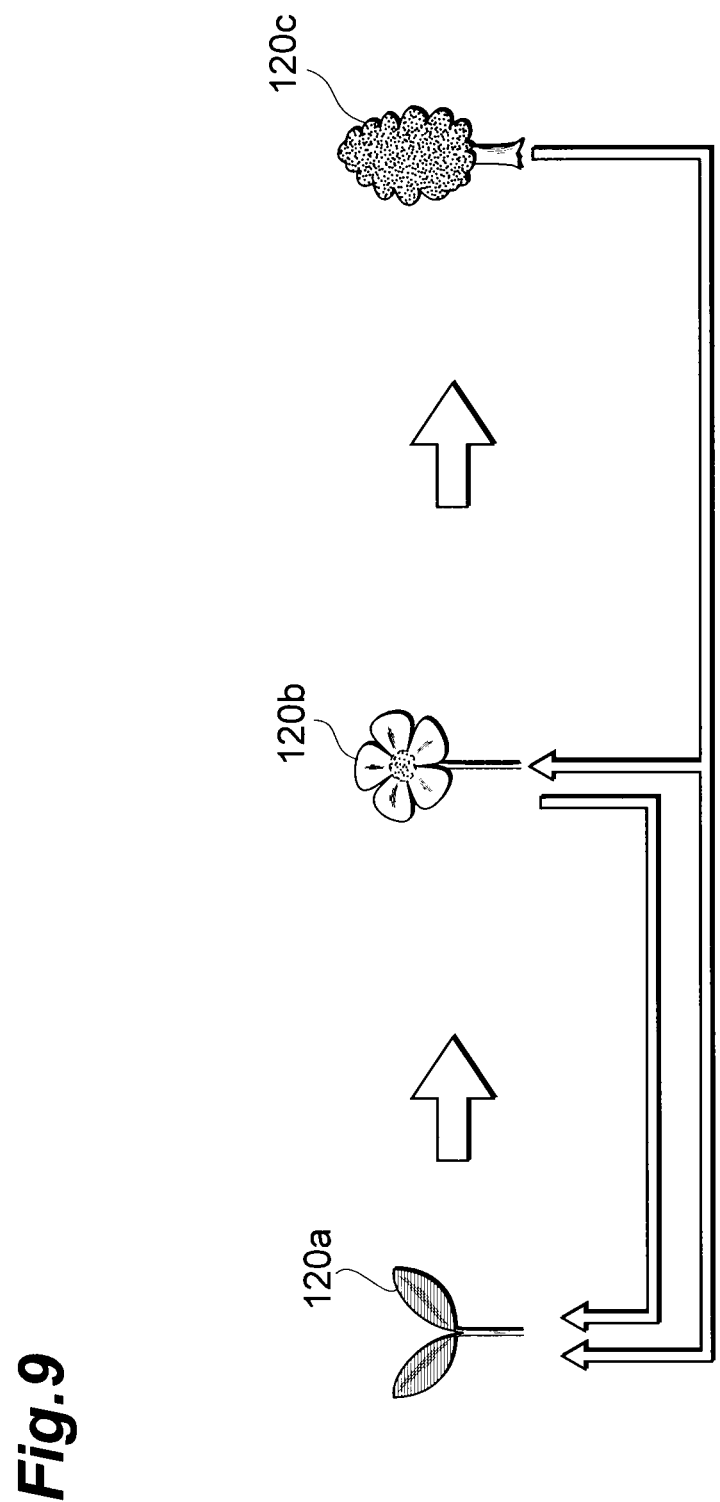
FIG. 9 is a diagram showing the transition of an image to be displayed on a background map in accordance with the degree of attainment of ecological traveling.

As shown in FIG. 9, in this embodiment, the degree of attainment of previous ecological traveling is expressed by animation of ecological travel symbols 120*a* to 120*c* indicating the degree of growth of a plant. As shown in FIG. 9, if the cumulative result of ecological traveling diagnosis to be "good" at the point from the past is equal to or greater than once and smaller than three times, the ecological travel symbol 120*a* including bud is displayed. If the cumulative result of ecological traveling diagnosis to be "good" is equal to or greater than three times and smaller than five times, the ecological travel symbol 120*b* indicating flower is displayed. If the cumulative result of ecological traveling diagnosis to be "good" is equal to or greater than five times, the ecological travel symbol 120*b* indicating tree is displayed.

With regard to the ecological travel symbols 120*a* to 120*c*, a form in which a plant is growing steadily, for example, in order of bud, flower, and tree may be displayed, and if there is a free time interval at which ecological traveling is not performed at the point, a form may be displayed such that flower falls and flower results to bud, or tree returns to flower to bud.

Figure 10:
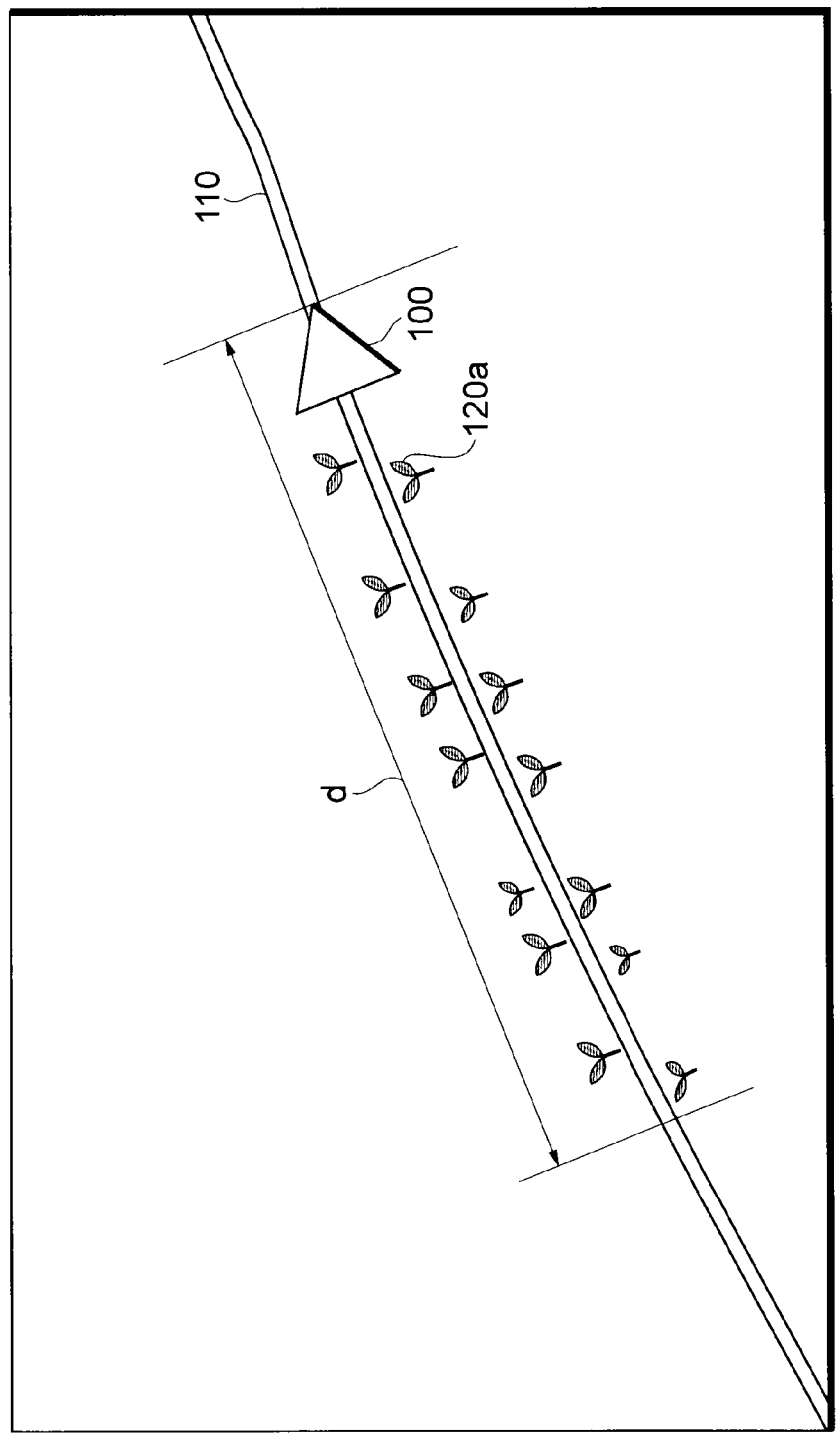
FIG. 10 is a diagram showing a form of displaying the degree of attainment of ecological traveling on a background map for each predetermined distance.
Figure 11:
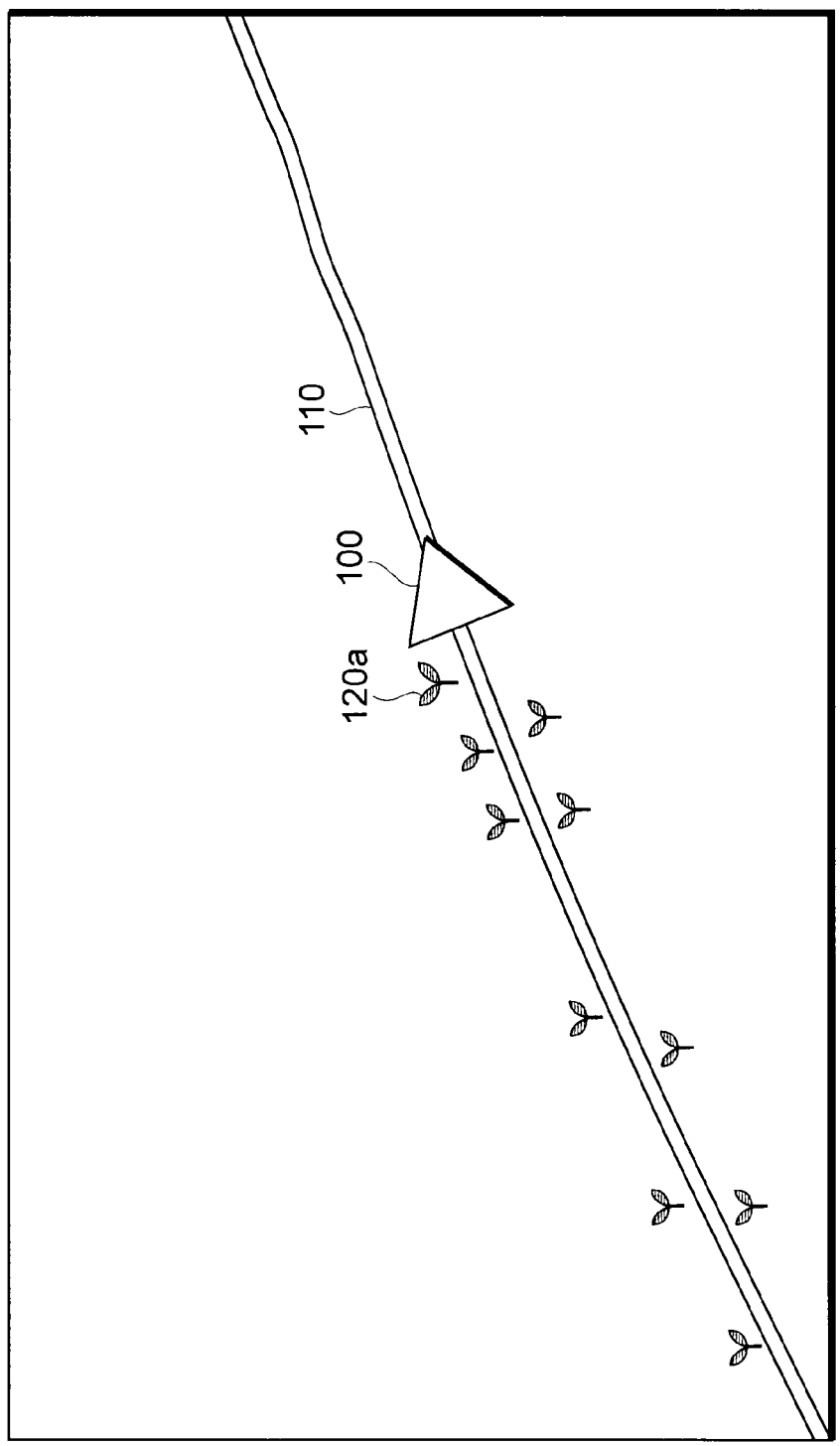
FIG. 11 is a diagram showing a form of displaying the degree of attainment of ecological traveling on a background map in real time.
Figure 12:
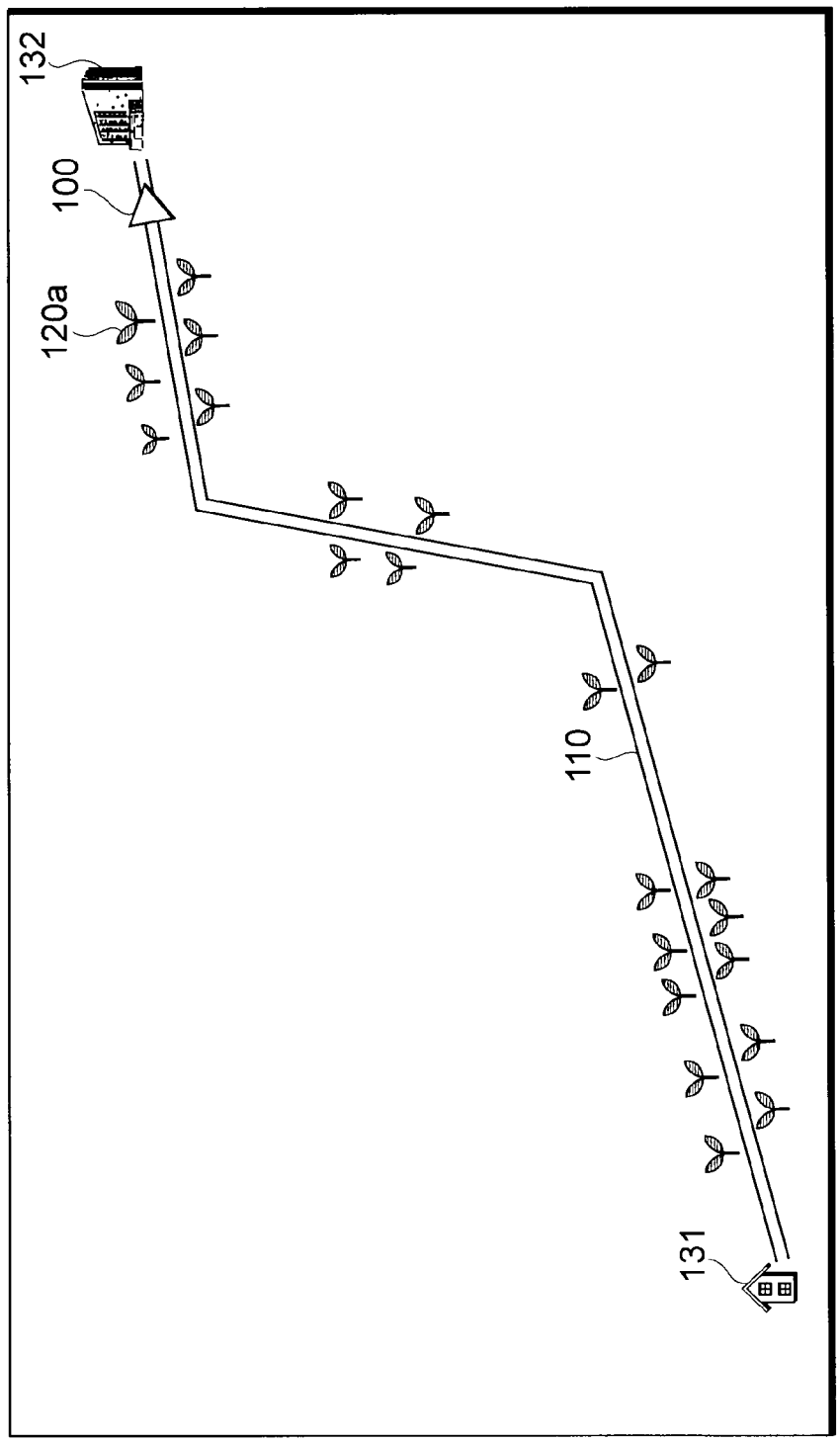
FIG. 12 is a diagram showing a form of displaying the degree of attainment of ecological traveling on a background map for each Trip.

As shown in FIG. 10, the display screen of the display device 30 can display the symbol 120*a* and the like for each predetermined distance d or for each predetermined period of time at which a vehicle symbol 100 travels on a road 110. The predetermined distance d can be set to, for example, 100 m, and the predetermined period of time can be set to, for example, 10 sec. As shown in FIG. 11, the display screen of the display device 30 can display the symbol 120*a* and the like in real time when the vehicle symbol 100 passes through the road 110. As shown in FIG. 12, the display screen of the display device 30 can display the symbol 120*a* and the like for each Trip from a point 131 of departure to a destination 132.

Figure 13:
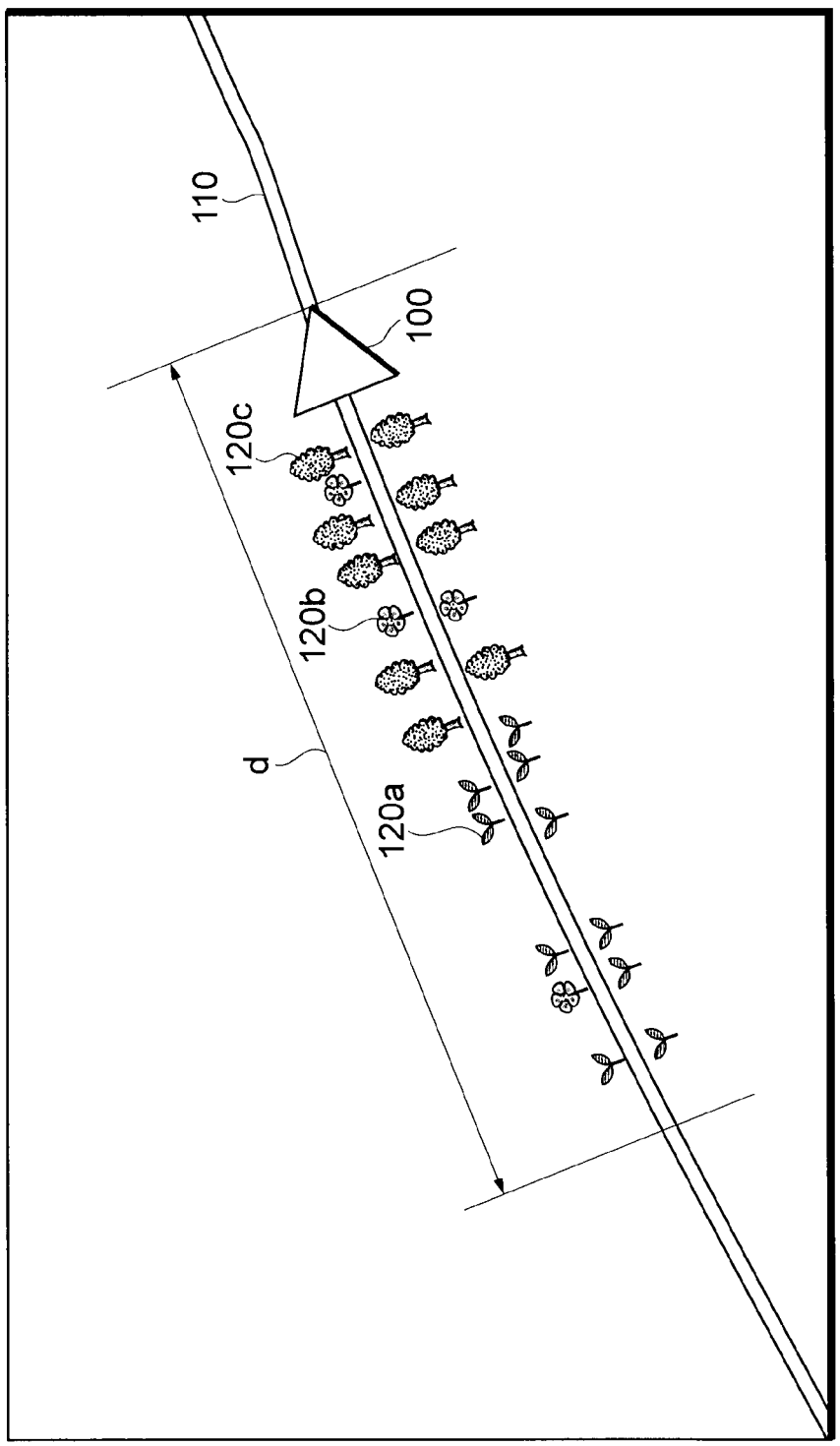
FIG. 13 is a diagram showing a form of displaying the cumulative degree of attainment of ecological traveling on a background map by an image for each predetermined distance.

In this embodiment, since the cumulative result of previous ecological traveling information and current ecological traveling information is displayed, for example, as shown in FIG. 13, the display screen of the display device 30 can display the symbols 120*a* to 120*c* for each predetermined distance d at which the vehicle symbol 100 travels on the road 110. The symbols 120*a* to 120*c* may change each time the vehicle symbol 100 passes.

Returning to FIG. 2, the ecological traveling diagnosis processing unit 20 accumulates the current diagnosis result and position information in the ecological traveling history DB 26 in association with each other (S104). Thus, when the vehicle travels the point next time, the in-vehicle apparatus 10*a* can perform the same operation as described above again.

According to this embodiment, the vehicle information processing unit 16 collects vehicle information, which is information relating to at least one of the discharge amount of exhaust gas, the amount of fuel consumption, the vehicle speed, the acceleration, and the use gear of the transmission of at least one vehicle at any of a predetermined point, a predetermined section, and a predetermined period of time. The ecological traveling history DB 26 accumulates the vehicle information collected by the vehicle information processing unit 16 for each point through which the vehicle has traveled. The display device 30 displays the vehicle information accumulated in the ecological traveling history DB 26 on a map including each point for each point through which the vehicle has traveled. Therefore, it becomes possible to allow the driver to recognize the previous traveling performance at the point through which the vehicle has traveled, and to more effectively provide the driver with a guide or a motivation to perform ecological traveling, thereby providing a more useful in-vehicle apparatus which allows the driver to perform ecological traveling.

According to this embodiment, the determination on whether or not the vehicle has performed ecological traveling is made on the basis of the discharge amount of exhaust gas, the amount of fuel consumption, the vehicle speed, the acceleration, and the use gear of the transmission. Therefore, it becomes possible to more accurately determine whether or not the vehicle has performed ecological traveling.

According to this embodiment, the display device 30 changes the content to be displayed in accordance with the vehicle information for each point through which the vehicle has traveled. Therefore, it becomes possible for the driver to intuitively recognize the traveling performance of the vehicle.

In particular, according to this embodiment, the display device 30 displays the vehicle information by the symbols 120a to 120c indicating the growth of a plant. Therefore, it becomes possible for the driver to more intuitively recognize the traveling performance of the vehicle.

According to this embodiment, the display device 30 displays the vehicle information accumulated in the ecological traveling history DB 26 by an image on a map including each point for each point through which the vehicle has traveled. Therefore, it becomes possible for the driver to more intuitively the traveling performance of the vehicle visually.

According to this embodiment, the display device 30 displays the symbols 120a to 120c indicating the growth of a plant on a magnified scale when the degree of attainment of ecological traveling of the vehicle is high, for example, when the discharge amount of exhaust gas in the vehicle information is small, or the like. Therefore, it becomes possible for the driver to more intuitively recognize the traveling performance of the vehicle.

In particular, according to this embodiment, as shown in FIGS. 10 to 13, the ecological traveling information of the added point of the vehicle symbol 100 is immediately reflected in the display screen of the display device 30. Therefore, it is possible for the driver to immediately understand the change in the state of ecological traveling. In this embodiment, as shown in FIG. 13, it is possible for the driver to recognize that ecological traveling can be attained at a point or on the road 110 where there are many symbols 120c indicating tree, without description using characters, graphs, or the like. That is, it becomes possible for the driver to more intuitively recognize the situation of ecological traveling, thereby shortening the time for which the driver watches the screen of the display device 30. In this embodiment, as the form in which a plant is growing after the vehicle symbol has passed, the symbols 120a to 120c change as animation. Therefore, it is possible for the driver to intuitively recognize at a glance that current traveling has been ecological traveling.

Figure 14:
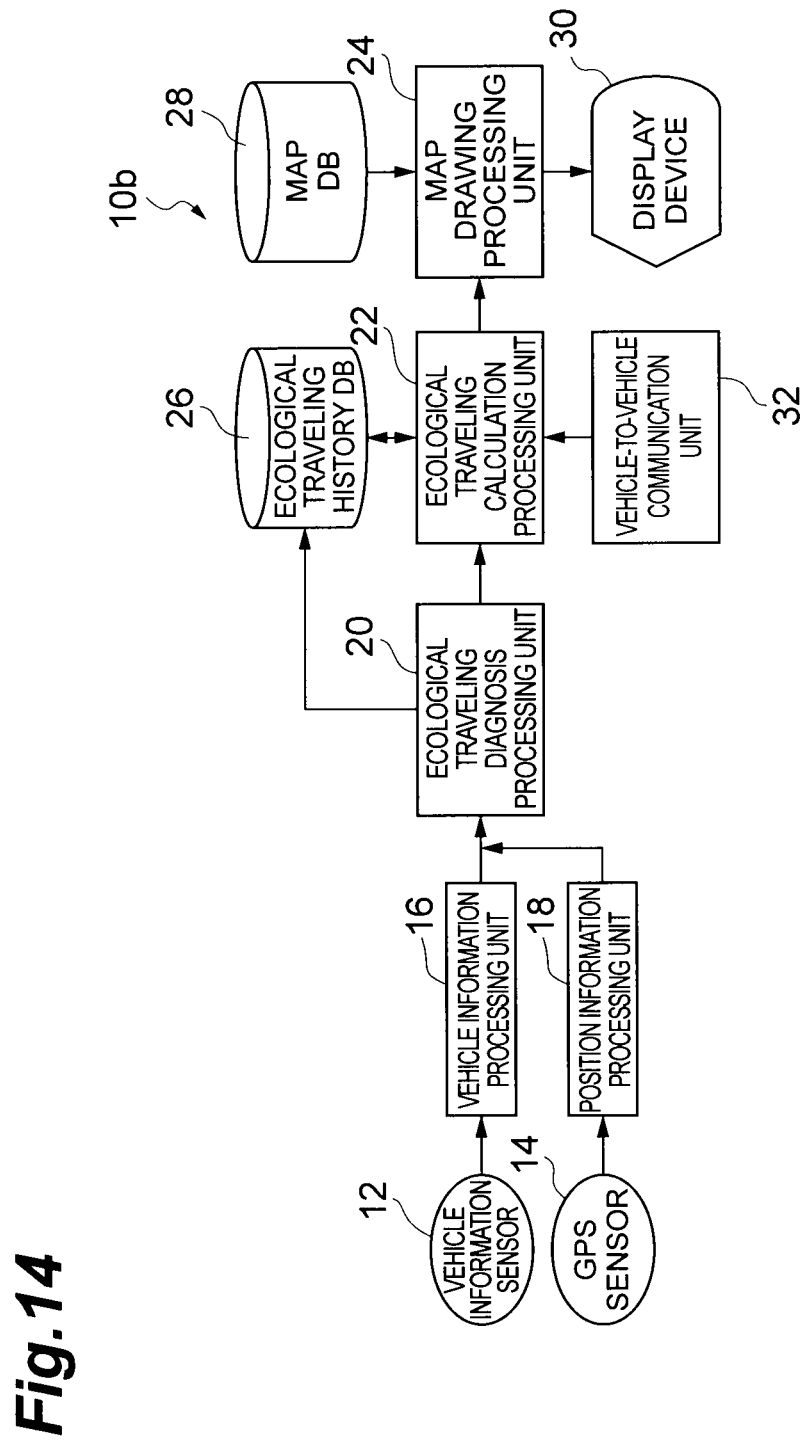
FIG. 14 is a block diagram showing the configuration of an in-vehicle apparatus according to a second embodiment.

Hereinafter, a second embodiment of the invention will be described. As shown in FIG. 14, an in-vehicle apparatus 10b of this embodiment is different from the first embodiment in that a vehicle-to-vehicle communication unit 32 is connected to the ecological traveling calculation processing unit 22 to perform vehicle-to-vehicle communication with other vehicles. The ecological traveling calculation processing unit 22 receives ecological traveling information of a plurality of other vehicles than the host vehicle for each point, compiles the ecological traveling information, and creates information indicating the situation of ecological traveling for each point through which the vehicle has traveled.

Figure 15:
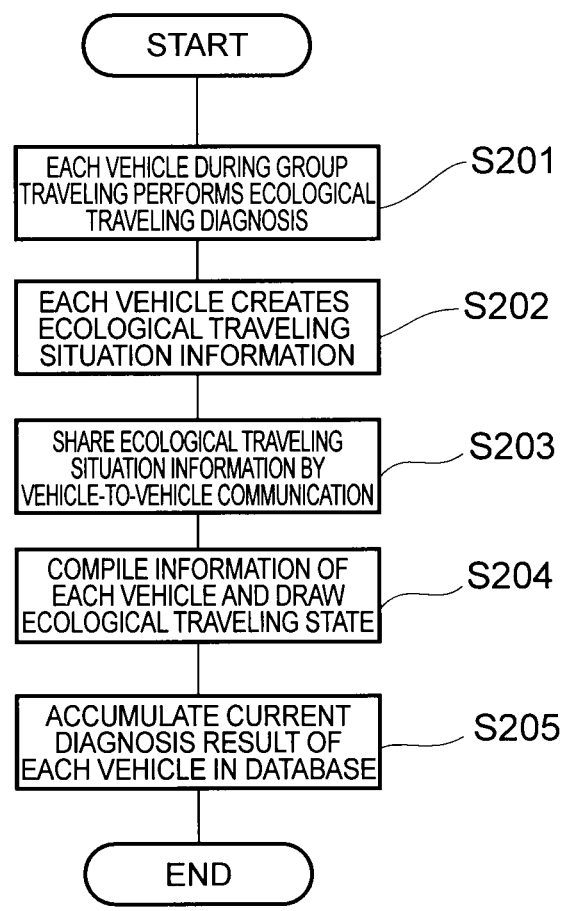
FIG. 15 is a flowchart showing the operation of the in-vehicle apparatus according to the second embodiment.

Hereinafter, the operation of the in-vehicle apparatus 10b of this embodiment will be described. It is assumed that three vehicles are performing group traveling. As shown in FIG. 15, the ecological traveling diagnosis processing unit 20 of the in-vehicle apparatus 10b of each vehicle during group traveling performs ecological traveling diagnosis in the same manner as in the first embodiment (S201). The ecological traveling calculation processing unit 22 of the in-vehicle apparatus 10b of each vehicle creates information indicating the situation of ecological traveling for each point through which the vehicle has traveled (S202).

The vehicle-to-vehicle communication unit 32 of the in-vehicle apparatus 10b of each vehicle shares the information indicating the situation of ecological traveling for each point through which the vehicle has traveled through vehicle-to-vehicle communication (S203). The ecological traveling calculation processing unit 22 of each vehicle compiles the information indicating the situation of ecological traveling of each vehicle shared through vehicle-to-vehicle communication, and the map drawing processing unit 24 draws a symbol indicating ecological traveling information on the display screen of the display device 30 on the basis of the compiling result in the same manner as in the first embodiment (S204).

Figure 16:
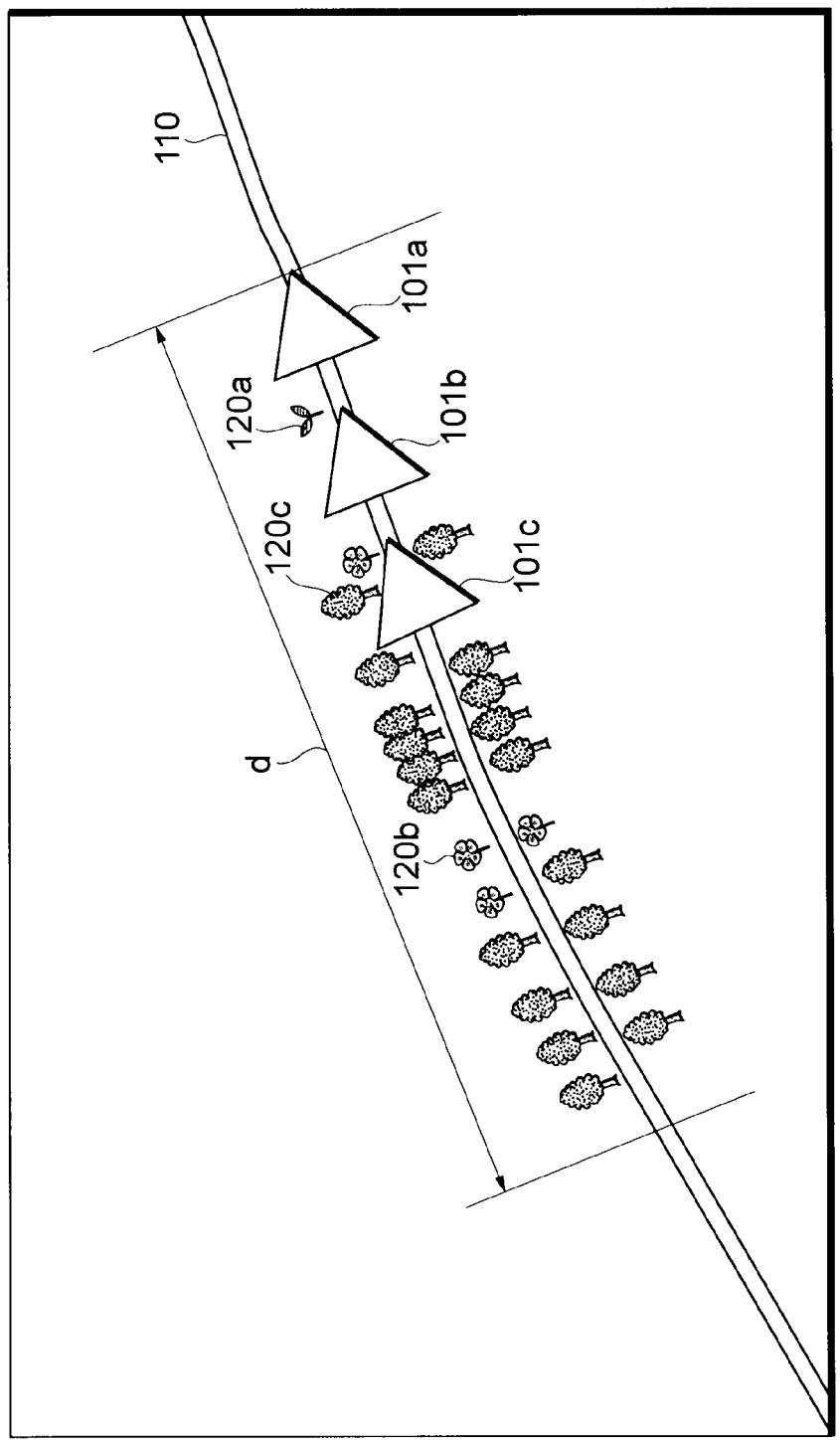
FIG. 16 is a diagram showing a form of displaying the cumulative degree of attainment of ecological traveling on a background map for each predetermined distance for a group.

In this case, as shown in FIG. 16, symbols 120a to 120c indicating the growth of a plant are displayed on the display screen of the display device 30 of each vehicle for each predetermined distance d through which vehicle symbols 101a to 101c during group traveling along the road 110 have passed. The ecological traveling diagnosis processing unit 20 of each vehicle accumulates the current diagnosis result and position information in the ecological traveling history DB 26 in association with each other (S205). Therefore, when each vehicle performs group traveling at the point next time, the in-vehicle apparatus 10b of each vehicle can perform the same operation as described above again.

In this embodiment, when a plurality of vehicles perform group traveling, the information indicating the situation of ecological traveling for each point through which the vehicle has traveled through vehicle-to-vehicle communication. Therefore, it becomes possible to allow the driver of each vehicle to recognize the previous traveling performance at the point, through which the vehicle has traveled, by group traveling, and to more effectively provide the driver with a guide or a motivation to perform ecological traveling compared to single traveling. As a result, it is possible to provide a more useful in-vehicle apparatus which allows the driver to perform ecological traveling.

Hereinafter, a third embodiment of the invention will be described. In this embodiment, a center distributes useful information for ecological traveling to a plurality of drivers who are the members of an organization for ecological traveling. In particular, in this embodiment, an ecological traveling map (hereinafter, referred to as an ecological map) indicating the state of ecological traveling of each member at each point is shared between the members.

Figure 17:
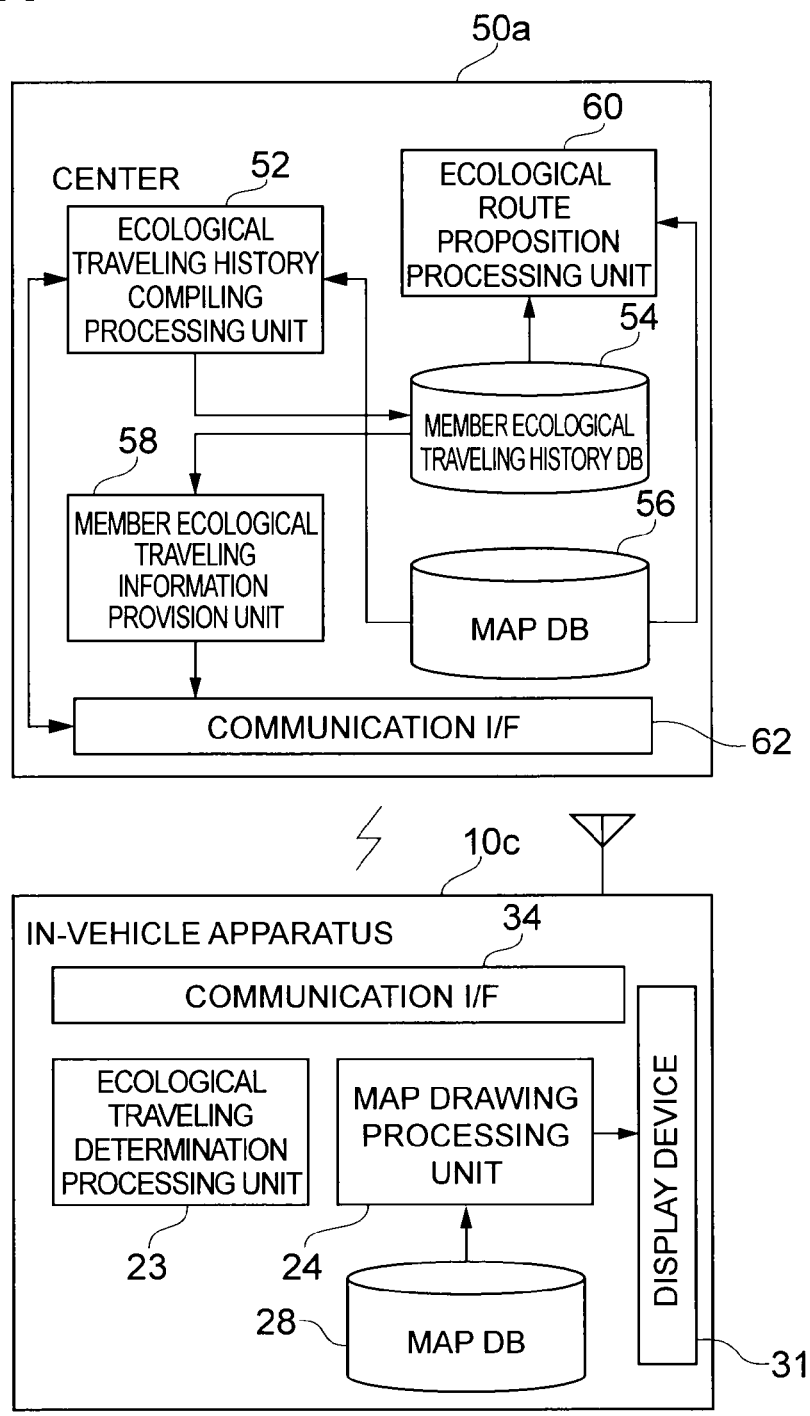
FIG. 17 is a block diagram showing the configuration of an in-vehicle apparatus and a center according to a third embodiment.

As shown in FIG. 17, an in-vehicle apparatus 10c of this embodiment includes an ecological traveling determination processing unit 23, a map drawing processing unit 24, a map DB 28, a display device 31, and a communication I/F 34.

The ecological traveling determination processing unit 23 compares the regular mileage corresponding to the type of the host vehicle with mileage information transmitted through communication with an in-vehicle ECU, and performs ecological traveling determination to be "good", "standard", and "bad". The result of the ecological traveling determination is transmitted to a center 50a by the communication I/F 34.

As in the first embodiment, the map drawing processing unit 24 is used to draw an ecological map on the display screen of the display device 31. The map drawing processing unit 24 requests the center 50a to provide the ecological traveling information of the members through the communication I/F 34, and performs drawing.

The communication I/F 34 is an interface which performs communication control between the in-vehicle apparatus 10c and the center 50a.

The center 50a includes an ecological traveling history compiling processing unit 52, a member ecological traveling history DB 54, a map DB 56, a member ecological traveling information provision unit 58, an ecological route proposition processing unit 60, and a communication I/F 62.

The ecological traveling history compiling processing unit 52 is used to compile the result of the ecological traveling determination received from the in-vehicle apparatus 10c for each node arranged on the road side. While the center 50a receives the latitude and longitude and the result of the ecological traveling from the in-vehicle apparatus 10*c* in association with each other, the ecological traveling history compiling processing unit 52 performs a matching process to the closest node, and compiles the result of the ecological traveling determination.

The member ecological traveling history DB 54 is a database which accumulates data compiled by the ecological traveling history compiling processing unit 52. The map DB 56 is a database which has link information for determining a node on which matching with the latitude and longitude is performed in the ecological traveling history compiling processing unit 52.

The member ecological traveling information provision unit 58 is used to read accumulated data of ecological traveling information in a designated area from the member ecological traveling history DB 54 in response to a request from the in-vehicle apparatus 10*c*, and to transmit data to the in-vehicle apparatus 10*c* through the communication I/F 62.

The ecological route proposition processing unit 60 is used to perform route search by applying a weight to a route, in which the ecological traveling determination to be "good" increases, on the basis of the history of ecological traveling information of the members read from the member ecological traveling history DB 54 in response to a request from the in-vehicle apparatus 10*c*, in addition to a basic route search function in the navigation system.

Similarly to the communication I/F 34 of the in-vehicle apparatus 10*c*, the communication UF 62 is an interface which performs communication control between the in-vehicle apparatus 10*c* and the center 50*a*. From the viewpoint of security and privacy protection, the communication I/F 34 of the in-vehicle apparatus 10*c* and the communication I/F 62 of the center 50*a* perform authentication at the time of communication, prevents access of a person other than the members, and even when communication is performed between members, prevents the ecological traveling information of the individual member from unnecessarily leaking.

Figure 18:
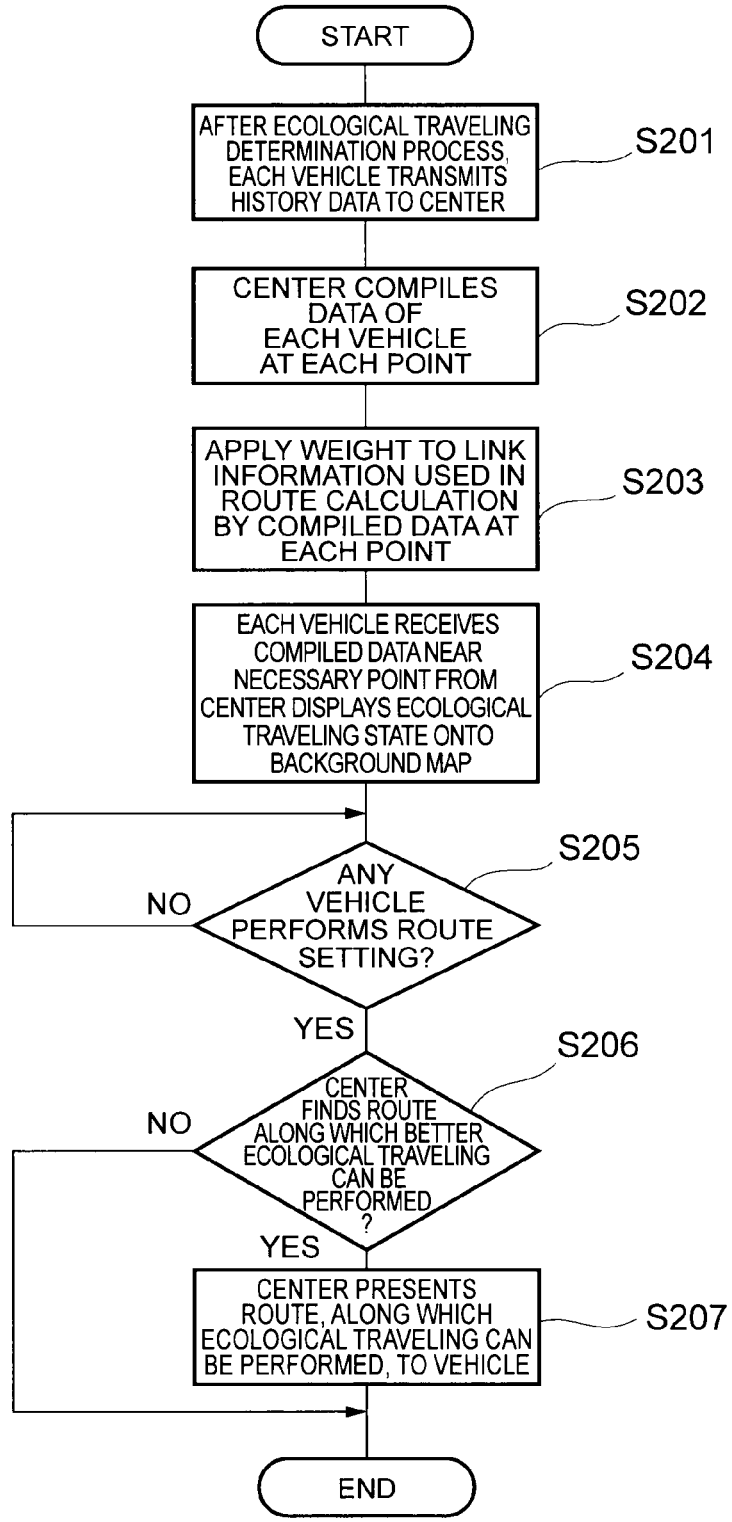
FIG. 18 is a flowchart showing the operations of the in-vehicle apparatus and the center according to the third embodiment.

Hereinafter, the operation of the in-vehicle apparatus 10*c* and the center 50*a* of this embodiment will be described. As shown in FIG. 18, the ecological traveling determination processing unit 23 of the in-vehicle apparatus 10*c* of each member performs ecological traveling determination at an interval of 10 m in the same manner as in the first embodiment, accumulates the result, and transmits data of the history of ecological traveling information to the center 50*a* after 1 Trip ends (S201).

The ecological traveling history compiling processing unit 52 of the center 50*a* compiles data of the ecological traveling information of each vehicle for each point, and accumulates data in the member ecological traveling history DB 54 (S202). As shown in FIG. 19, the member ecological traveling history DB 54 accumulates the date, the member number, the in-vehicle apparatus number, the latitude/longitude, and the result of ecological traveling diagnosis in association with each other. In the example of FIG. 19, the result of ecological traveling diagnosis to be "good" is twice within a predetermined period at an A point.

The ecological route proposition processing unit 60 of the center 50*a* applies a weight to link information for use in route calculate by compiled data of the ecological traveling information for each point (S203).

when he engine of the vehicle starts, the communication I/F 34 of the in-vehicle apparatus 10*c* of each vehicle requests the center 50*a* for compiled data of ecological traveling information near a necessary point. The member ecological traveling information provision unit 58 of the center 50*a* distributes compiled data of the ecological traveling information to the in-vehicle apparatus 10*c*. The map drawing processing unit 24 of the in-vehicle apparatus 10*c* which receives compiled data of the ecological traveling information from the center 50*a* displays the state of the ecological traveling on a background map near the point displayed on the display screen of the display device 31 with reference to map data of the map DB 28 (S204).

Figure 20:
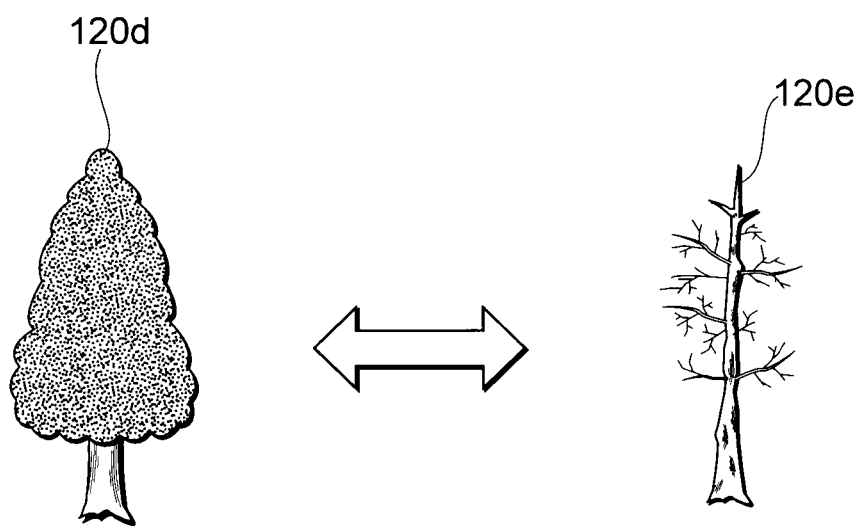
FIG. 20 is a diagram showing the transition of an image to be displayed on a background map in accordance with the degree of attainment of ecological traveling.

As shown in FIG. 20, in this embodiment, the degree of attainment of previous ecological traveling is expressed by animation of ecological travel symbols 120*d* to 120*e* indicating a wooded/withered state. As shown in FIG. 20, as the cumulative result of ecological traveling diagnosis to be "good" from the past increases at the point, the ecological travel symbol 120*d* indicating a wooded state is displayed. As the cumulative result of ecological traveling diagnosis to be "good" from the past decreases at the point, the ecological travel symbol 120*e* indicating a withered state is displayed.

Figure 21:
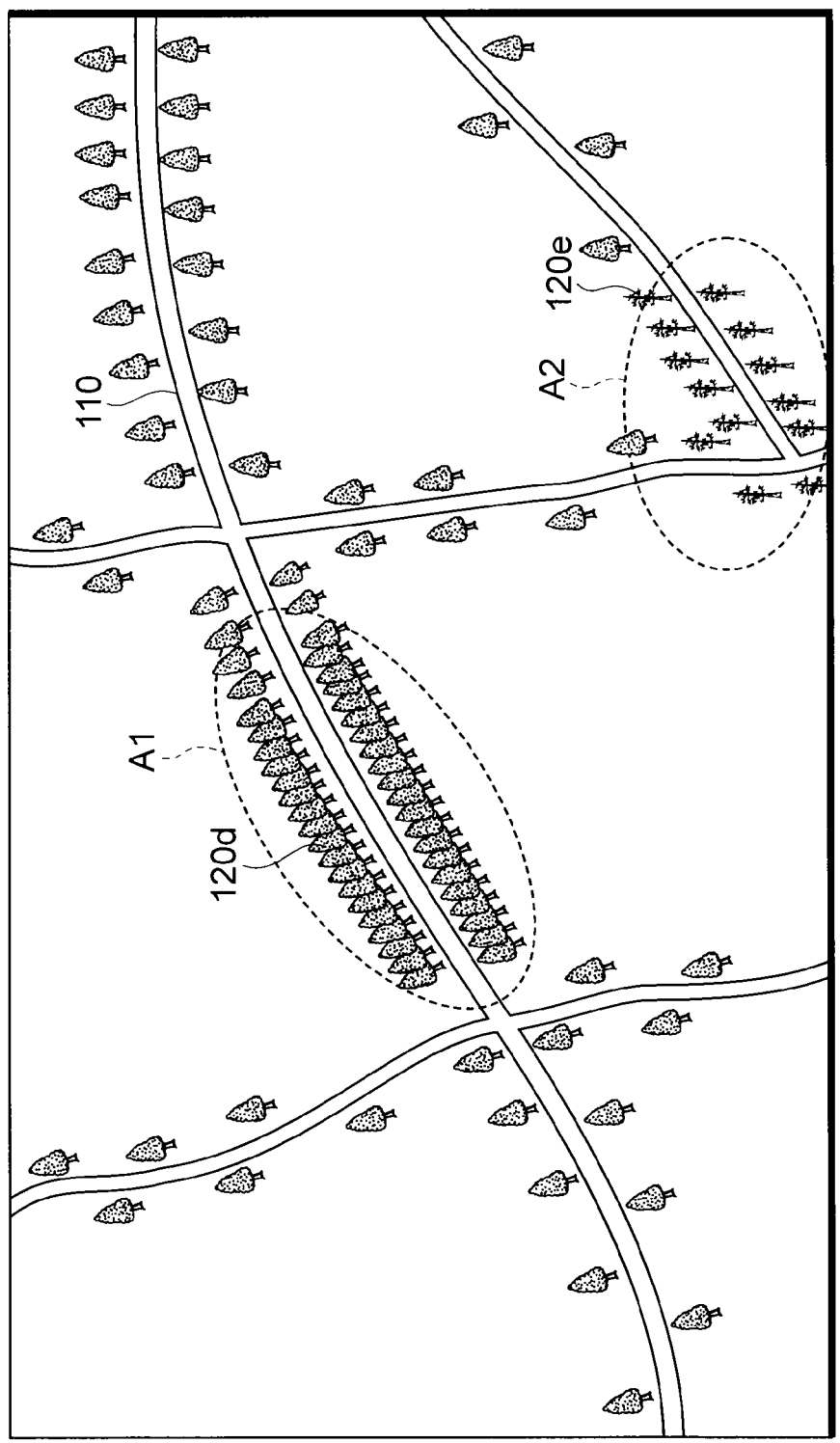
FIG. 21 is a diagram showing a form of displaying the cumulative degree of attainment of ecological traveling on a background map common to members by an image.

As shown in FIG. 21, in this embodiment, the degree of attainment of ecological traveling is expressed by the density of ecological travel symbol 120*d*. For example, in an area A1 where many vehicles can attain ecological traveling, the density of the ecological travel symbol 120*d* indicating tree is drawn to be high. In an area where a small number of vehicles can attain ecological traveling, the density of the ecological travel symbol 120*d* indicating tree is drawn to be low. Meanwhile, in an area A2 on a road having heavy traffic flow where a small number of vehicles can attain ecological traveling, the ecological travel symbol 120*e* indicating withered tree is drawn, and the state where that ecological traveling may not be attained is transmitted to the members.

That is, in this embodiment, it is possible for the driver to recognize that a road on which the density of non-withered trees is high is a road on which ecological traveling is easily attained, without description using characters or icons. In the case of icons, it is necessary that the meanings of the icons are explained to the driver, and the driver perceives the meanings. The concept that tree means the protection of the environment is already common sense, and it is obvious that, if the number of trees is large, ecological traveling can be attained, thereby enabling intuitive recognition. Therefore, in this embodiment, it is possible to shorten the time for which the driver watches the display screen of the display device 31.

Figure 22:
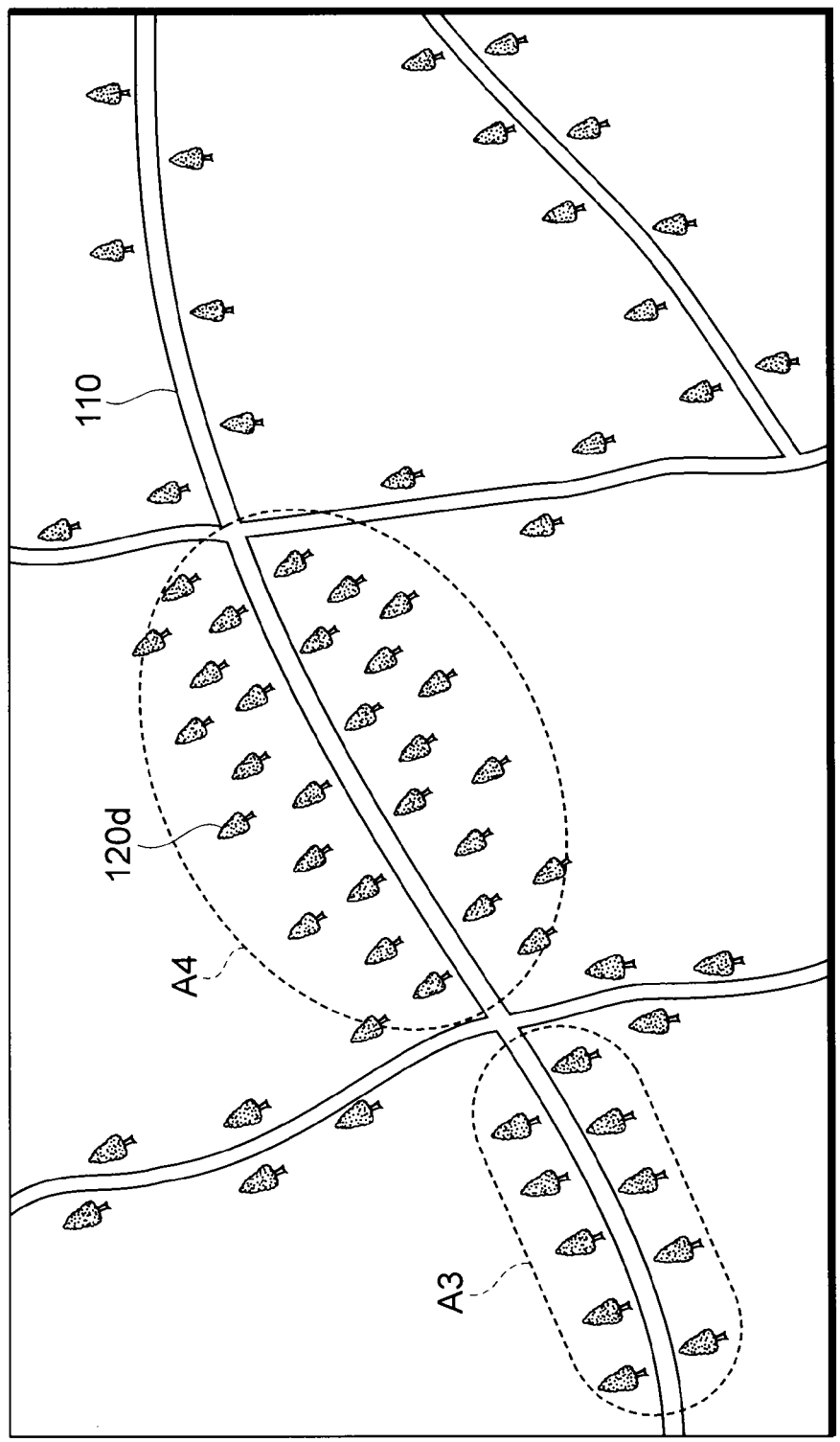
FIG. 22 is a diagram showing a form of displaying a traffic flow on a background map common to members by an image.

In this embodiment, as shown in FIG. 22, the map drawing processing unit 24 determines the width of the ecological travel symbol 120*d* indicating tree, or the like to be drawn aside of the road 110 in accordance with the traffic flow on the road 110. That is, in an area A3 where traffic flow is light, the ecological travel symbol 120*d* indicating tree is drawn to have a small width. In an area A4 where traffic flow is heavy, the ecological travel symbol 120*e* indicating tree is drawn to have a large width. The traffic flow is transmitted to the center 50*a* by information from the road facility or the in-vehicle apparatus 10*c* at the point. The center 50*a* distributes information relating to the traffic flow to the in-vehicle apparatus 10*c* of each vehicle.

In the related art, there is the general concept based on the road type that traffic flow on a national road is heavy and traffic flow on a prefectural road is light. However, actually, there is a prefectural road on which traffic flow is very heavy, causing a sense of discomfort. In this embodiment, the width of the ecological travel symbol 120*d* to be drawn indicating the state of ecological traveling is determined on the basis of actual data on how many vehicles pass. Therefore, it becomes easy for the driver to understand the correlation between the traffic flow on an actual road and ecological traveling.

Returning to FIG. 18, when a vehicle whose driver subscribes to the organization performs route setting for route guidance by the navigation system (S205), the ecological route proposition processing unit 60 of the center 50a performs route search by applying a weight to a route in a decreasing order of the number of times of the ecological traveling determination to be "good" on the basis of the history of the ecological traveling information of the members read from the member ecological traveling history DB 54 in response to a request from the in-vehicle apparatus 10c (S206).

When the ecological route proposition processing unit 60 of the center 50a finds a route in which the ecological traveling determination to be "good" increases compared to a route set on the vehicle side (S206), the ecological route proposition processing unit 60 presents the route, on which ecological traveling can be performed, to the in-vehicle apparatus 10c of the vehicle (S207).

Figure 23:
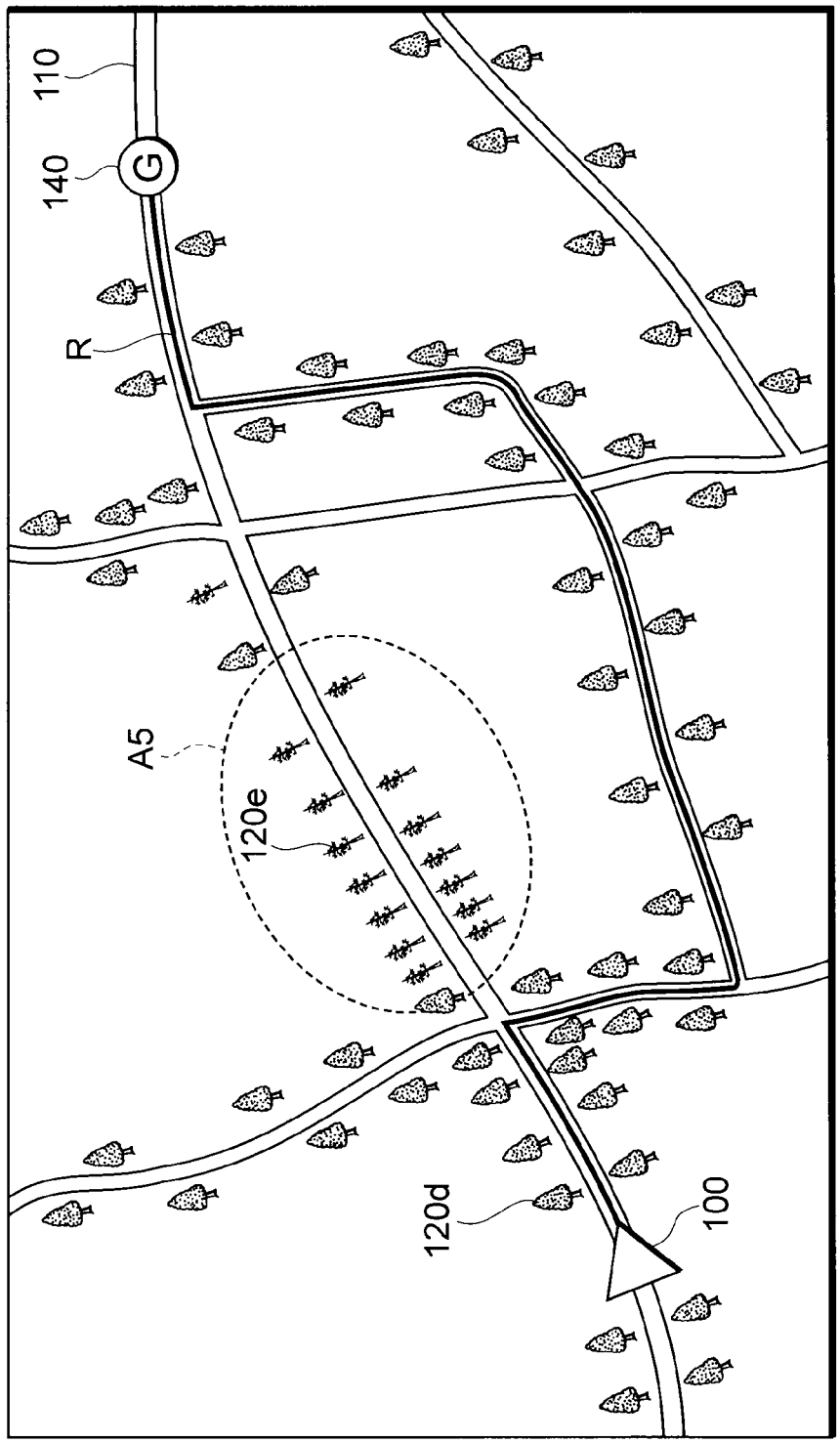
FIG. 23 is a diagram showing a form of displaying an ecological traveling possible route propositioned by a center on a background map common to members on the basis of ecological traveling history information.

For example, as shown in FIG. 23, when a vehicle indicated by the vehicle symbol 100 goes toward a destination indicated by a destination symbol 140, and if the vehicle will pass through a straight road, the vehicle passes through an area A5 on the ecological map where a large number of ecological travel symbols 120e indicating that the members may not attain ecological traveling are displayed. Accordingly, the ecological route proposition processing unit 60 presents a route R which bypasses the area A5.

That is, in this embodiment, the ecological route proposition processing unit 60 performs a data process such that a large weight is applied to a road on which many members can attain ecological traveling, and a route on which many members may not attain ecological traveling and perform unpleasant traveling is bypassed. The map drawing processing unit 24 of the in-vehicle apparatus 10c draws the route R proposed from the center 50a on the ecological map based on data by the members, and allows intuitive understanding of a proposition by the traveling result of the members.

Figure 24:
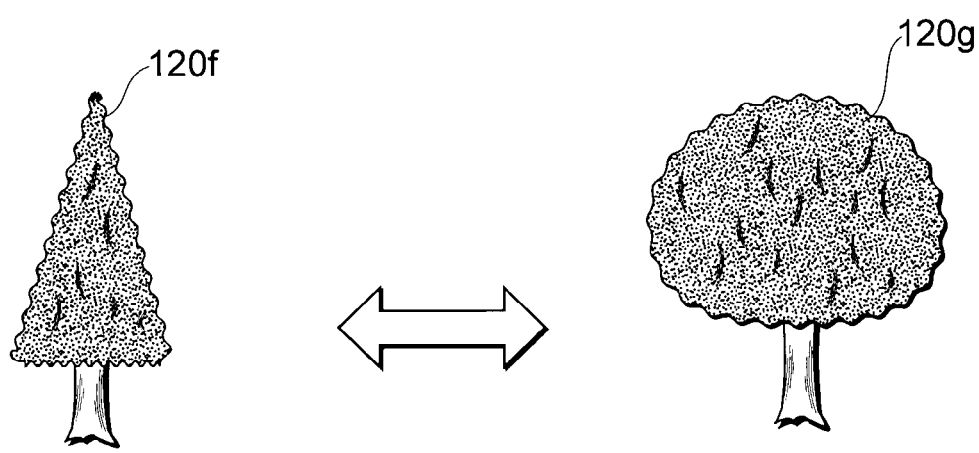
FIG. 24 is a diagram showing the transition of an image to be displayed on a background map in accordance with the type of a vehicle passing through a road.

In this embodiment, when the ecological traveling information of the members is shared by the ecological map, it is possible to reflect information on the type of a vehicle to be driven by each member on the ecological map. For example, as shown in FIG. 24, from the viewpoint of the type, regular size, displacement, and mileage of a vehicle, with regard to a vehicle which is large, and has large displacement and low mileage, ecological traveling information is displayed with an ecological travel symbol 120f indicating needleleaf tree. With regard to a vehicle which is small, and has small displacement and high mileage, an ecological traveling information may be displayed with an ecological travel symbol 120g indicating broadleaf tree.

The size of a vehicle according to the classification, such as displacement, or ease of passing of a vehicle through a road based on width is intimately related to ease of ecological driving. Accordingly, in this embodiment, when the ecological traveling history compiling processing unit 52 of the center 50a compiles the ecological traveling information transmitted from the in-vehicle apparatus 10c, information on the type of the vehicle or the like is also compiled in association with the ecological traveling information. With regard to the information on the type of the vehicle or the like, at the time of membership registration, the driver also registers the information on the type of the vehicle or the like, and the information is read at the time of authentication through communication between the in-vehicle apparatus 10c and the center 50a. Alternatively, with regard to the information on the type, size, displacement, mileage, and the like of the vehicle, the values on the catalog of the vehicle may be referenced.

Figure 25:
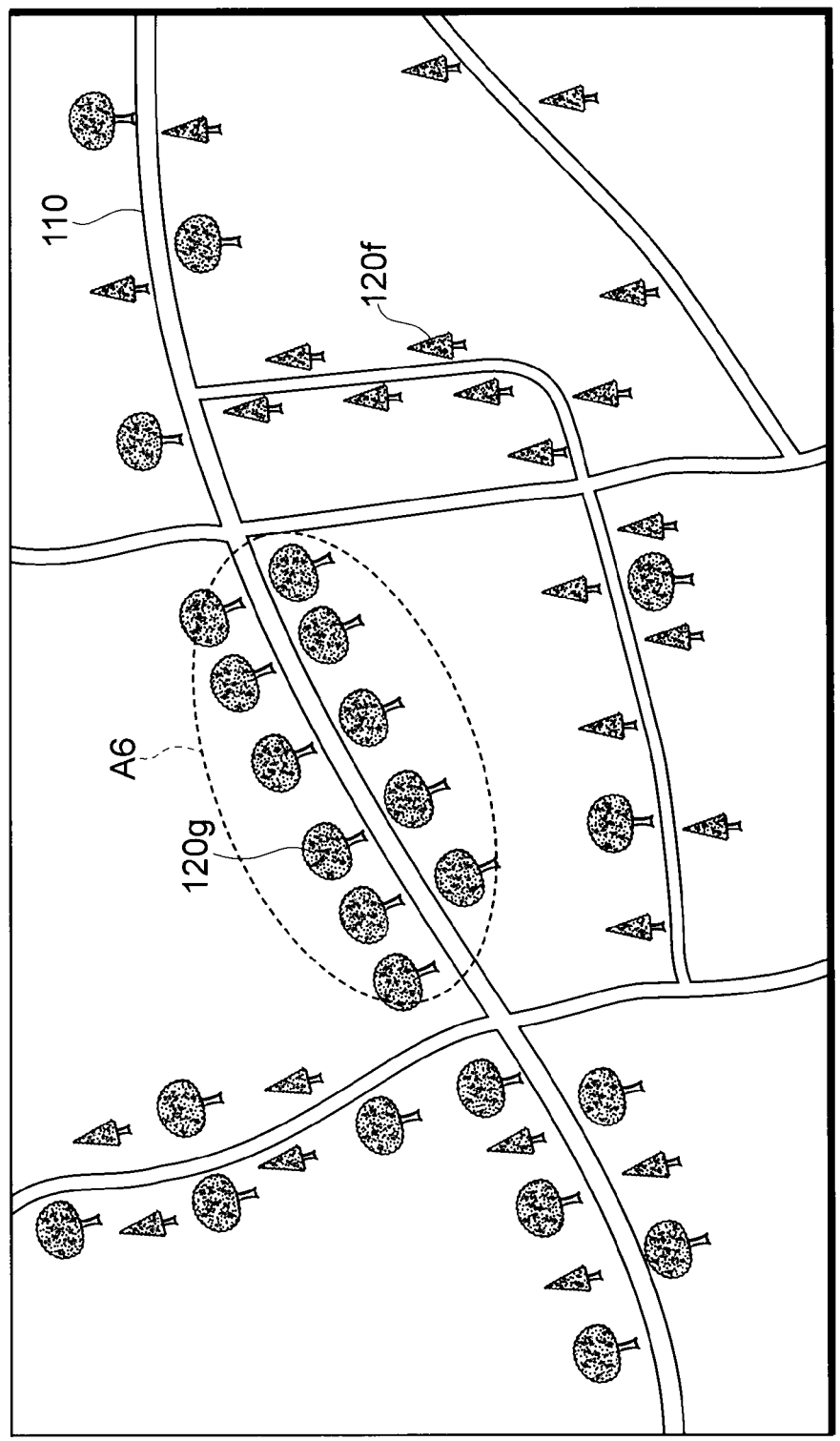
FIG. 25 is a diagram showing a form of displaying the degree of attainment of ecological traveling on a background map common to members by an image in accordance with the type of a vehicle passing through a road.

When drawing on the ecological map, for example, as shown in FIG. 25, the map drawing processing unit 24 can display the ecological traveling information with the ecological travel symbol 120g indicating broadleaf tree in an area A6 where a vehicle which easily attains ecological traveling has performed ecological traveling, and can display ecological traveling information with the ecological travel symbol 120f indicating needleleaf tree at a point at which a vehicle which attains ecological traveling with difficulty has performed ecological traveling.

Therefore, it is possible for the driver to intuitively know a road appropriate for the type of his/her vehicle or the like. In the center 50a, when the collected ecological traveling information is displayed on the in-vehicle apparatus 10c side, the driver changes the type of tree of an ecological travel symbol for only a vehicle classified based on the same type, size, or the like. Thus, though different depending on drivers having membership, it is possible to request drivers who drive the vehicles of the same type or the like to recognize useful information (user adaptation), or to develop the conscious of creating a community of drivers who drive the vehicles of the same type, size, or the like.

In this embodiment, when the ecological traveling information of the members is shared by the ecological map, it is also possible to reflect information on the driving skill, experience, or the like of the driver as a member on the ecological map. For example, as shown in FIG. 26, with regard to ecological traveling information of a driver having poor driving skill and experience, the ecological traveling information can be displayed with an ecological travel symbol 120h indicating seeding compared to an ecological travel symbol 120d indicating ecological traveling information of a driver having ordinary skill or experience. With regard to ecological traveling information of a driver having high driving skill and a great deal of experience, the ecological traveling information can be displayed with an ecological travel symbol 120i indicating old tree.

The driving skill or experience of a driver is intimately related to whether or not the driver can perform ecological driving. Accordingly, in this embodiment, when the ecological traveling history compiling processing unit 52 of the center 50a compiles the ecological traveling information transmitted from the in-vehicle apparatus 10c, the information on the skill, experience, or the like of the driver is also compiled in association with the ecological traveling information. With regard to the information on the skill or the like of the driver, at the time of membership registration, the driver also registers information on the level of the driving skill of the driver, how much the driver drives, or the like, and the information is read at the time of authentication through communication between the in-vehicle apparatus 10c and the center 50a. Alternatively, the driving skill of the driver can be determined on the basis of the number of previous traffic violations, the cumulative number of times of the determination that ecological driving has been performed, or the like. The driving experience of the driver can be determined on the basis of the number of days elapsed from the start of a service from the center 50a, the cumulative driving time, or the like.

Figure 27:
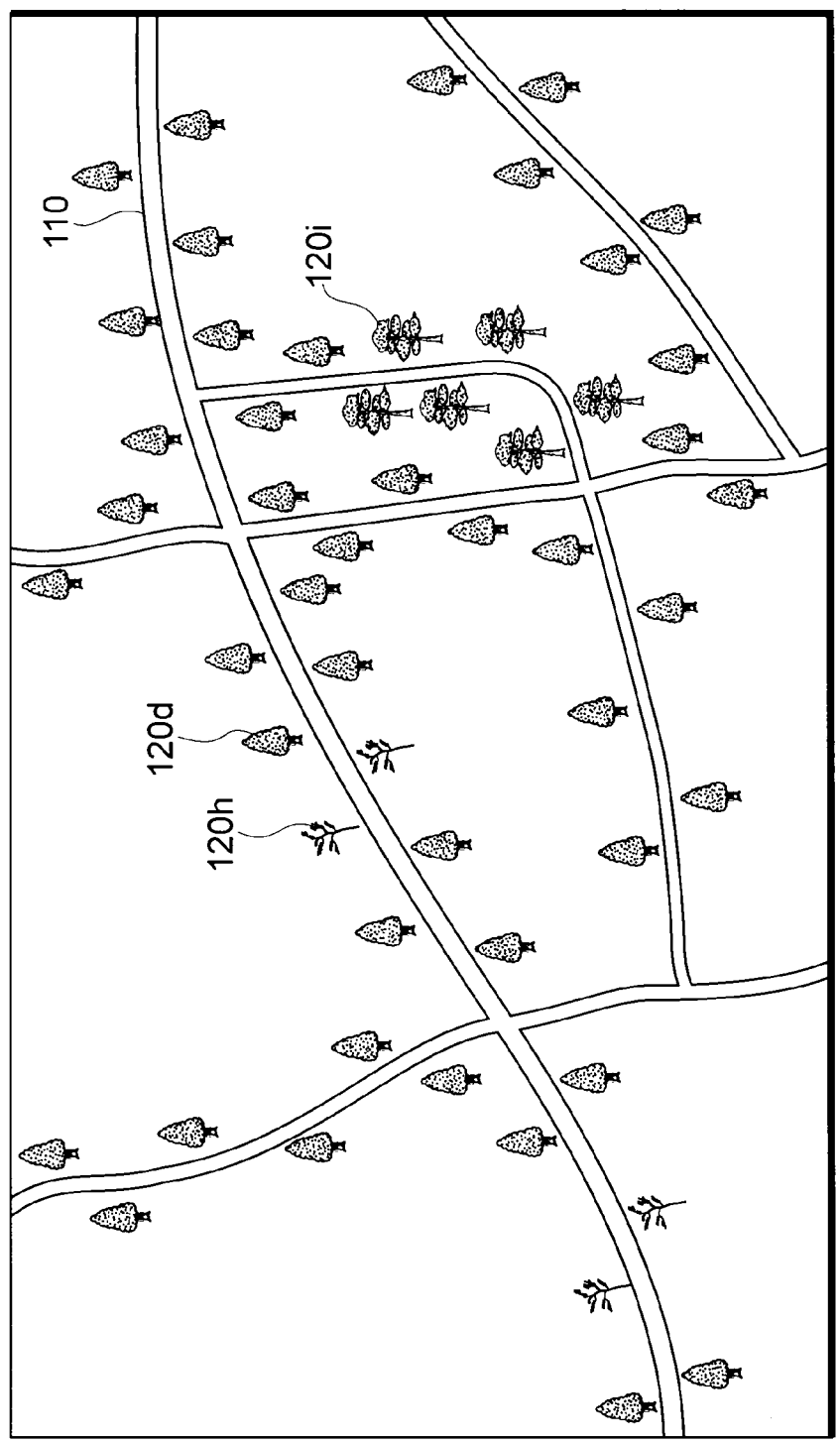
FIG. 27 is a diagram showing a form of displaying the degree of attainment of ecological traveling on a background map common to member in accordance with how much driving experience the members have.

When drawing on the ecological map, for example, as shown in FIG. 27, the map drawing processing unit 24 can display the ecological traveling information with an ecological travel symbol 120h indicating seeding at a point at which a driver having poor driving skill and experience has performs ecological traveling, and can display the ecological traveling information with an ecological travel symbol 120i indicating old tree for the ecological traveling information of a driver having high driving skill and a great deal of experience.

Therefore, it is possible for the driver to intuitively know a road appropriate for the his/her driving skill or experience. In particular, a driver having poor driving skill and experience can reference the tendency of ecological traveling of a driver having high driving skill and a great deal of experience. It is also possible to develop the conscious of creating a community of drivers having the same level of driving skill or experience.

In this embodiment, the ecological traveling history compiling processing unit 52 collects ecological traveling information, which is information relating to at least one of the discharge amount of exhaust gas, the amount of fuel consumption, the vehicle speed, the acceleration, and the use gear of the transmission of at least one vehicle at any of a predetermined point, a predetermined section, and a predetermined period of time. The member ecological traveling history DB 54 accumulates the ecological traveling information collected by the ecological traveling history compiling processing unit 52 for each point through which the vehicle has traveled. The member ecological traveling information provision unit 58 distributes the ecological vehicle information accumulated in the member ecological traveling history DB 54 to the vehicle. Therefore, it is possible for the driver of the vehicle, to which the ecological traveling information is distributed, to recognize the previous traveling performance at the point through which the vehicle has traveled, and it becomes possible to more effectively provide the driver with a guide or a motivation to perform ecological traveling, thereby providing a more useful center which allows the driver to perform ecological traveling.

In this embodiment, in the center 50a, the ecological traveling history compiling processing unit 52 collects information relating to the traffic flow at the point through which the vehicle has traveled. The member ecological traveling information provision unit 58 distributes the ecological traveling information accumulated in the member ecological traveling history DB 54 and the information relating to the traffic flow at the point, through which the vehicle has traveled, collected by the ecological traveling history compiling processing unit 52.

In the in-vehicle apparatus 10c, when traffic flow at a point is heavy, the display device 31 enlarges an area on a map where the ecological travel symbol 120d is displayed near the point. For this reason, it become easy for the driver to intuitively recognize the traffic flow at the point. Therefore, even though a display area is wide, a symbol with bad traveling performance is displayed, it is possible for the driver to intuitively recognize that many vehicles are not performing ecological traveling.

In particular, in this embodiment, in the center 50a, the ecological traveling history compiling processing unit 52 collects information relating to the type, size, displacement, or mileage of the vehicle. The member ecological traveling history DB 54 accumulates ecological traveling information in association with the information relating to the type or the like of the vehicle collected by the ecological traveling history compiling processing unit 52. The member ecological traveling information provision unit 58 distributes the ecological traveling information accumulated in the member ecological traveling history DB 54 and the information relating to the type or the like of the vehicle accumulated in association with the ecological traveling information.

In the in-vehicle apparatus 10c, the display device 31 changes and displays the ecological travel symbols 120f and 120g in accordance with the type, size, displacement, or mileage of the vehicle. Therefore, it is possible for the driver to intuitively recognize the type, size, displacement, or mileage of the vehicle, and it becomes possible to provide the driver with a guide or a motivation to perform more accurate ecological traveling. It is possible for the driver of the vehicle to recognize what traveling performance the vehicles having various types, sizes, displacements, and mileages achieve at each point. In particular, it is possible for the driver to recognize the degree of ecological traveling, which is performed by a vehicle having the same displacement or mileage as the vehicle being driven by the driver, and it becomes possible to more effectively provide the driver with a guide or a motivation to perform ecological traveling.

In this embodiment, in the center 50a, the ecological traveling history compiling processing unit 52 collects at least one of the driving skill and experience of the driver of the vehicle. The member ecological traveling history DB 54 accumulates ecological traveling information in association with the driving skill or experience of the driver of the vehicle collected by the ecological traveling history compiling processing unit 52. The member ecological traveling information provision unit 58 distributes the ecological traveling information accumulated in the member ecological traveling history DB 54 and the information relating to the driving skill or experience of the driver of the vehicle accumulated in association with the ecological traveling information.

In the in-vehicle apparatus 10c, the display device 31 changes and displays the ecological travel symbols 120h and 120i in accordance with at least one of the driving skill and experience of the driver of the vehicle. Therefore, it is possible for the driver to intuitively recognize the driving skill or experience of the driver, and it becomes possible to provide the driver with a guide or a motivation to perform more accurate ecological traveling. It is possible for the driver of the vehicle, to which the ecological traveling information is distributed, to recognize what traveling performance the drivers having various driving skills and experience achieve at each point. In particular, it is possible for the driver to recognize the degree of ecological traveling, which is performed by another driver having comparable skill and experience, at each point, and it becomes possible to more effectively provide the driver with a guide or a motivation to perform ecological traveling.

Figure 28:
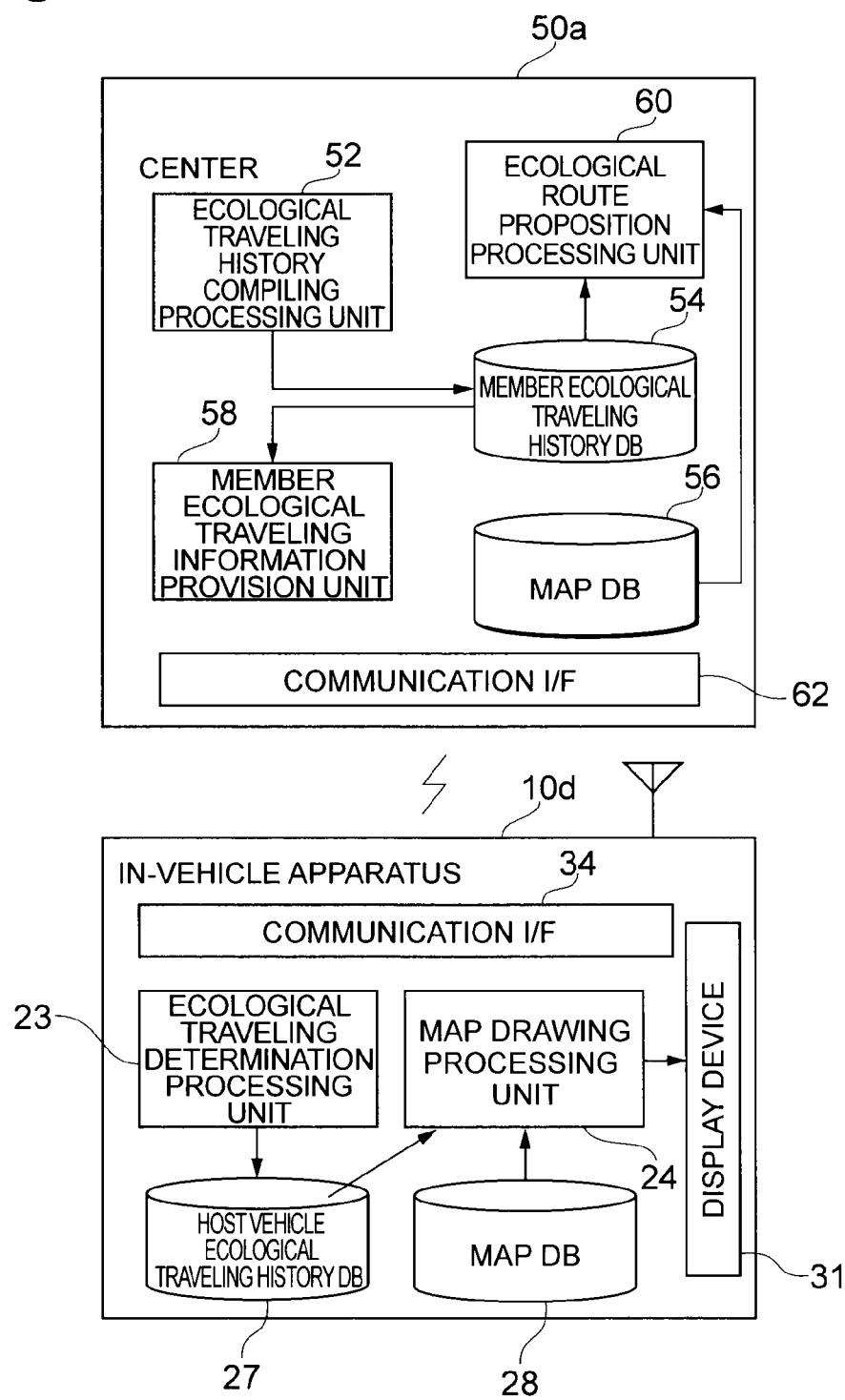
FIG. 28 is a block diagram showing the configuration of an in-vehicle apparatus and a center according to a fourth embodiment.

Hereinafter, a fourth embodiment of the invention will be described. In this embodiment, ecological traveling information based on the driving of a member and ecological traveling information based on the driving of another member are distinguishably displayed. As shown in FIG. 28, an in-vehicle apparatus 10d of this embodiment includes a host vehicle ecological traveling history DB 27 which accumulates ecological traveling information for each point through which the vehicle driven by the member has traveled.

Figure 29:
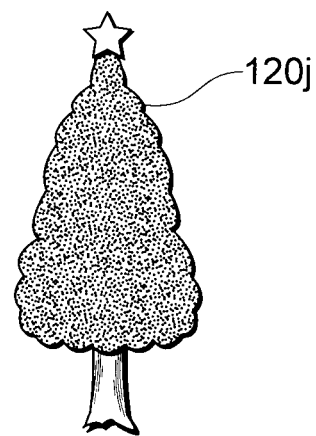
FIG. 29 is a diagram showing an image which displays the degree of attainment of ecological traveling of a driver.

In this embodiment, when the ecological traveling information of the members is shared in the ecological map, information of a member and information of another member are simultaneously and distinguishably displayed, and the degree of contribution of the member to the protection of the environment is expressed visually, thereby developing the conscious of the protection of the environment. For example, as shown in FIG. 29, in this embodiment, an ecological travel symbol 120j of the member can be distinguishable from ecological travel symbols 120d and 120e of other members.

As described above, the member ecological traveling history DB 54 accumulates the member number for identifying the member and the ecological traveling information in association with each other. For this reason, the in-vehicle apparatus 10d receives information other than the ecological traveling information according to the member number from the center 50a, and reads the ecological traveling information of the member from the host vehicle ecological traveling history DB 27 to draw an ecological map on the display screen of the display unit 31. Alternatively, the in-vehicle apparatus 10d may receive the ecological traveling information of the member and other members from the center 50a, and may draw the ecological traveling information to be distinguished between the member and other members in accordance with the member number.

Figure 30:
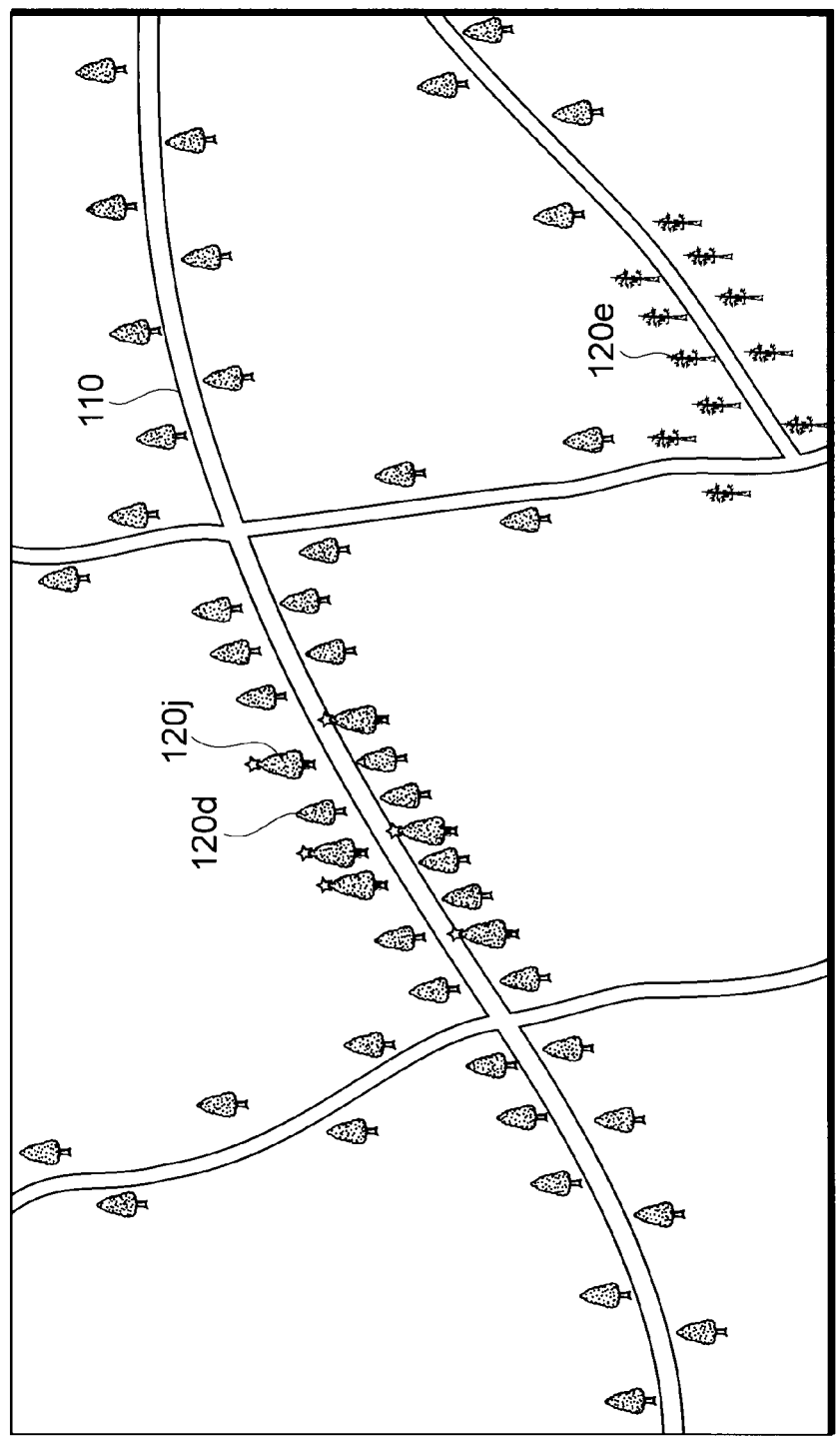
FIG. 30 is a diagram showing a form of displaying the cumulative degree of attainment of ecological traveling on a background map common to members by an image of a driver and an image of another member.

When drawing on the ecological map, for example, as shown in FIG. 30, the map drawing processing unit 24 can display the ecological traveling information with an ecological travel symbol 120j at a point at which the member has performed ecological traveling. Therefore, it is possible to allow the driver to intuitively recognize the degree of contribution of the driver.

In this embodiment, in the center 50a, the ecological traveling history compiling processing unit 52 collects information for identifying the vehicles. The member ecological traveling history DB 54 accumulates ecological traveling information in association with the information for identifying the vehicles collected by the ecological traveling history compiling processing unit 52. The member ecological traveling information provision unit 58 distributes the ecological traveling information accumulated in the member ecological traveling history DB 54 and the information for identifying the vehicles accumulated in association with the ecological traveling information.

In the in-vehicle apparatus 10d, the display device 31 changes and displays the vehicle information for a plurality of vehicles with ecological travel symbols 120d and 120j on the map, and changes and displays the symbols between the host vehicle and other vehicles. Therefore, it is possible for the driver to intuitively recognize the degree of contribution to the protection of the environment by the traveling performance of the host vehicle. For this reason, the driver evaluates his/her traveling, making it easy to obtain a guide or a motivation to perform ecological traveling in future traveling.

Figure 31:
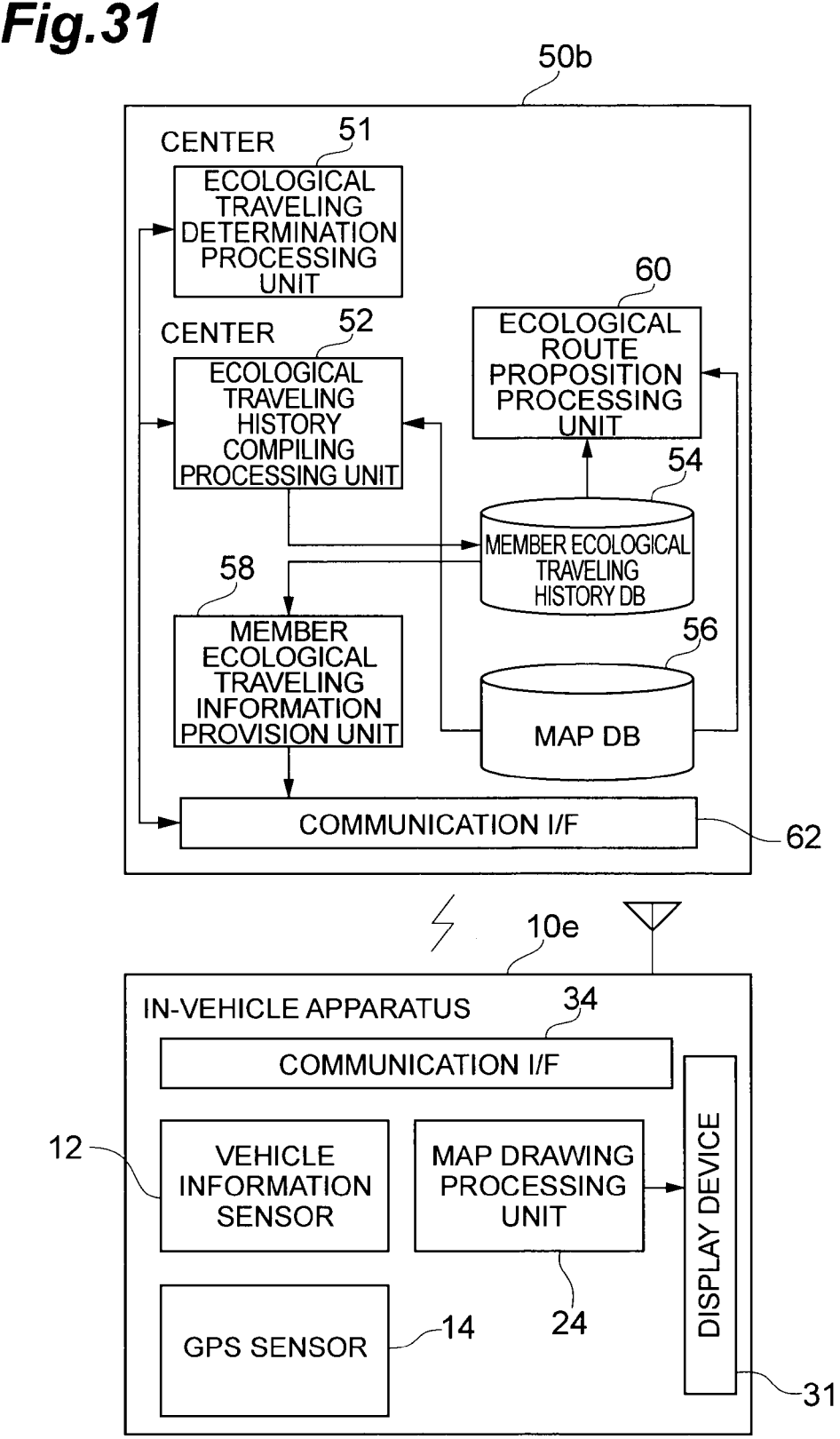
FIG. 31 is a block diagram showing the configuration of an in-vehicle apparatus and a center according to a fifth embodiment.

Hereinafter, a fifth embodiment of the invention will be described. As shown in FIG. 31, in this embodiment, while an in-vehicle apparatus 10e is not provided with an ecological traveling determination processing unit which performs ecological traveling determination from information detected by the vehicle information sensor 12, a center 50b is provided with an ecological traveling determination processing unit 51 which performs ecological traveling determination.

The in-vehicle apparatus 10e transmits vehicle information, such as the discharge amount of exhaust gas, the amount of fuel consumption, the vehicle speed, the acceleration, and the use gear of the transmission of the vehicle, detected by the vehicle information sensor 12 and position information detected by the GPS sensor 14 to the center 50b as they are. In the center 50b, ecological determination is made for the vehicle information received from the in-vehicle apparatus 10e by the ecological traveling determination processing unit 51, and a process is performed by the ecological traveling history compiling processing unit 52 in the same manner as in the third embodiment.

In this embodiment, the ecological traveling determination processing unit 51 collects vehicle information, such as the discharge amount of exhaust gas of the vehicle, at any of a predetermined point, a predetermined section, and a predetermined period of time, and determines the degree of contribution of ecological traveling of the vehicle to the protection of the environment on the basis of the vehicle information.

The member ecological traveling history DB 54 accumulates ecological traveling information, which is the degree of contribution of traveling of the vehicle to the protection of the environment determined by the ecological traveling determination processing unit 51, for each point through which the vehicle has traveled. The member ecological traveling information provision unit 58 distributes the ecological traveling information accumulated in the member ecological traveling history DB 54. Therefore, the vehicle simply has a function of transmitting the vehicle information to the center 50b and receiving the ecological traveling information from the center 50b, such that it is possible for the driver of the vehicle, to which the ecological traveling information is distributed, to recognize the performance of previous ecological traveling at the point through which the vehicle has traveled, thereby simplifying the equipment of the vehicle.

Although the embodiments of the invention have been described, the invention is not limited to the foregoing embodiments and various modifications may be made.

INDUSTRIAL APPLICABILITY

The invention can provide a more useful in-vehicle apparatus and a center more which allows a driver to perform ecological traveling.

REFERENCE SIGNS LIST 10a to 10e: vehicle control device
12: vehicle information sensor
14: GPS sensor
16: vehicle information processing unit
18: position information processing unit
20: ecological traveling diagnosis processing unit
22: ecological traveling calculation processing unit
23: ecological traveling determination processing unit
24: map drawing processing unit
26: ecological traveling history DB
27: host vehicle ecological traveling history DB
28: map DB
30: display device
31: display device
32: vehicle-to-vehicle communication unit
34: communication I/F
50a, 50b: center
51: ecological traveling determination processing unit
52: ecological traveling history compiling processing unit
54: member ecological traveling history DB
56: map DB
58: member ecological traveling information provision unit
60: ecological route proposition processing unit
62: communication I/F
100, 100a to 100c: vehicle symbol
110: road
120a to 120j: ecological travel symbol
132: point of departure
134: destination
140: destination symbol

The invention claimed is:
1. An in-vehicle apparatus comprising:
a vehicle information collection device which collects vehicle information, which is information relating to an emission amount of at least one vehicle at any of a predetermined point, a predetermined section, and a predetermined period of time;

a traveling history database which accumulates the vehicle information collected by the vehicle information collection device along with a point through which the vehicle has traveled; and a display device which displays the vehicle information accumulated in the traveling history database for each point through which the vehicle has traveled, wherein the display device displays the vehicle information accumulated in the traveling history database with a symbol of a plurality of symbols which indicate gradually a degree of attainment as to whether or not the vehicle information satisfies a predetermined condition by an image on a map including each point for each point through which the vehicle has traveled, when a discharge amount of exhaust gas in the vehicle information is smaller, when an amount of fuel consumption in the vehicle information is smaller, when a vehicle speed in the vehicle information is lower, when an acceleration in the vehicle information is lower, or when a reduction ratio of a use gear of the transmission in the vehicle information is smaller, the display device displays the symbol on the map on a more magnified scale, and the display device displays the symbol while changing a kind of the symbols according to a cumulative number of times from the past that the vehicle information satisfied the predetermined condition at the point through which the vehicle has traveled.

2. The in-vehicle apparatus according to claim 1,
wherein the display device changes and displays the symbol in accordance with at least one of the type, size, displacement, and mileage of the vehicle.

3. The in-vehicle apparatus according to claim 1,
wherein the display device changes and displays the symbol in accordance with at least one of the driving skill and experience of the driver of the vehicle.

4. The in-vehicle apparatus according to claim 1,
wherein the traveling history database accumulates the vehicle information for a plurality of vehicles along with points through which the vehicles have traveled, and
the display device displays the vehicle information for a plurality of vehicles accumulated in the traveling history database with symbols by images on a map including the points for the respective points through which a plurality of vehicles have traveled, and changes and displays the symbols between a host vehicle and other vehicles.

5. The in-vehicle apparatus according to claim 1,
wherein, when traffic flow at each point is heavier, the display device enlarges more an area where the symbol is displayed on the map near the point.

6. The in-vehicle apparatus according to claim 1,
wherein the information relating to the emission amount is information relating to at least one of the discharge amount of exhaust gas, the amount of fuel consumption, the vehicle speed, the acceleration, and the use gear of the transmission of the vehicle.

7. The in-vehicle apparatus according to claim 1,
wherein the display device changes the content to be displayed in accordance with the vehicle information for each point through which the vehicle has traveled.

* * * * *